US006279099B1

(12) United States Patent
Van Hook et al.

(10) Patent No.: US 6,279,099 B1
(45) Date of Patent: Aug. 21, 2001

(54) CENTRAL PROCESSING UNIT WITH INTEGRATED GRAPHICS FUNCTIONS

(75) Inventors: Timothy J. Van Hook, Atherton; Leslie D. Kohn; Robert Yung, both of Fremont, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/648,250

(22) Filed: Aug. 25, 2000

Related U.S. Application Data

(60) Continuation of application No. 09/244,187, filed on Feb. 4, 1999, which is a division of application No. 08/638,390, filed on Apr. 26, 1996, now abandoned, which is a continuation-in-part of application No. 08/236,572, filed on Apr. 29, 1994, now Pat. No. 5,734,874.

(51) Int. Cl.[7] .......... G06F 15/00
(52) U.S. Cl. .......... 712/23; 712/36; 345/522; 345/503
(58) Field of Search .......... 712/23, 36, 205, 712/215; 345/513, 503, 524, 523

(56) References Cited

U.S. PATENT DOCUMENTS 5,157,388 * 10/1992 Kohn .......... 345/136
5,204,828 * 4/1993 Kohn .
5,222,240 * 6/1993 Patel .......... 712/218
5,268,995 * 12/1993 Diefendorff et al. .......... 395/122
5,375,216 * 12/1994 Moyer et al. .......... 711/123
5,377,320 * 12/1994 Abi-Ezzi et al. .......... 395/502
5,440,642 * 8/1995 Denenberg et al. .......... 381/71.13
5,546,551 * 8/1996 Kohn .......... 707/102
5,574,872 * 11/1996 Rotem et al. .......... 712/200

FOREIGN PATENT DOCUMENTS 395 348 A3 * 10/1990 (EP) .
380098 A3 * 8/1991 (EP) .
2 265 065 * 9/1993 (GB) .
94/08287 * 4/1994 (WO) .

OTHER PUBLICATIONS

MC88110–Second Generation Risc Microprocessor User's Manual ; Motorola, 1991 ; pp 1–4–1–17; 3–1—3–2/15; 5–1–5–25; 7–9; 7–15; 7–19; 7–20–7–21.*
Mahan et al.; Hewlett–Packard Precision Architecture: The Processor; pp 4–22 1986.*

* cited by examiner

*Primary Examiner*—Larry D. Donaghue
(74) *Attorney, Agent, or Firm*—Townsend and Townsend and Crew

(57) ABSTRACT

An optimized, superscalar microprocessor architecture for supporting graphics operations in addition to the standard microprocessor integer floating point operations is provided. Independent execution paths are provided for different graphics instructions to allow parallel execution of instructions which commonly occur together. The invention also optimizes the use of register file accesses to avoid, as much as possible, interference between graphics instructions needing to access a register file and other instruction accesses which would occur in combination with graphics instructions, thereby avoiding pipeline stalls and allowing parallel execution.

9 Claims, 24 Drawing Sheets

INSTRUCTION MEMORY MANAGEMENT UNIT (IMMU) 44a
FROM MEMORY 12
PREFETCH & DISPATCH UNIT (PDU) 46
INSTRUCTION CACHE 40
10
DATA MEMORY MANAGEMENT UNIT (DMMU) 44b
14
LOAD STORE UNIT (LSU) 48
DATA CACHE 42
INTEGER MUL/DIV 30
INTEGER ALU 31
FLOATING POINT DIV./SQ RT. 25
FP/GRAPHICS ALU 26
FP/GRAPHICS MUL. 28
TO/FROM MEMORY
INTEGER REGISTER FILE 36
FLOATING POINT REGISTER FILE 38

| | GRAPHIC INSTRUCTION GROUP | GRAPHIC INSTRUCTIONS | EXECUTION UNIT |
|---|---|---|---|
| 200 | GSR | RDASR, WRASR | IEU |
| 202 | PARTITIONED ADD/SUBTRACT | FPADD, FPSUB | FP/GRU-A |
| 204 | GRAPHICS DATA ALIGNMENT | ALIGNADDRESS, ALIGNDATA | FP/GRU-A |
| 206 | PIXEL DISTANCE | PDIST | FP/GRU-M |
| 208 | PARTITIONED MULTIPLICATION | FPMULT | FP/GRU-M |
| 210 | PARTITIONED EXPAND & MERGE | FPEXPAND, FPMERGE | FP/GRU-A |
| 212 | PARTITIONED PACK | FPPACK | FP/GRU-M |
| 214 | LOGICAL | FZERO,FONE,FSRC,FNOT,FOR,FAND,FNAND,ETC. | FP/GRU-A |
| 216 | COMPARE | FPCMP | FP/GRU-M |
| 218 | EDGE HANDLING | EDGE | IEU |
| 220 | 3-D ARRAY ACCESS | ARRAY | IEU |
| 222 | MEMORY ACCESS | PST,SLD/SST,BLD/BST | LSU |

| | opcode | op3 | operation |
|---|---|---|---|
| 98a | ALIGNADDRESS | 000011000 | CALCULATE ADDRESS FOR MISALIGNED DATA ACCESS |
| 98b | ALIGNADDRESS1_ LITTLE | 000011010 | CALCULATE ADDRESS FOR MISALIGNED DATA ACCESS, LITTLE ENDIAN |
| 100 | FALIGNDATA | 001001000 | PERFORMS DATA ALIGNMENT FOR MISALIGNED DATA |

| EXEMPLARY ASSEMBLY LANGUAGE SYNTAX |
|---|
| alignaddr $reg_{rs1}, reg_{rs2}, reg_{rd}$ |
| alignaddr1 $reg_{rs1}, reg_{rs2}, reg_{rd}$ |
| faligndata $freg_{rs1}, freg_{rs2}, freg_{rd}$ |

*FIG. 7A.* op = 10, op3 = 110110

| | opcode | op3 | operation |
|---|---|---|---|
| 106a | FPACK16 | 000111001 | 4 16-bit add |
| 106b | FPACK32 | 000111010 | 2 32-bit add |
| 106c | FPACKFIX | 000111101 | 4 16-bit subtract |

| EXEMPLARY ASSEMBLY LANGUAGE SYNTAX | |
|---|---|
| fpack16 | $freg_{rs2}, freg_{rd}$ |
| fpack32 | $freg_{rs1}, freg_{rs2}, freg_{rd}$ |
| fpackfix | $freg_{rs2}, freg_{rd}$ |

op = 10, op3 = 110110

| | opcode | opf | operation |
|---|---|---|---|
| 138 | PDIST | 000111110 | distance between 8 8-bit components |

| Exemplary Assembly Language Syntax |
|---|
| pdist $freg_{rs1}$, $freg_{rs2}$, $freg_{rd}$ |

| | opcode | opf | operation |
|---|---|---|---|
| 140a | EDGE8 | 000000000 | 8 8-bit edge boundary processing |
| 140b | EDGE8L | 000000010 | 8 8-bit edge boundary processing, little endian |
| 140c | EDGE16 | 000000100 | 4 16-bit edge boundary processing |
| 140d | EDGE16L | 000000110 | 4 16-bit edge boundary processing, little endian |
| 140e | EDGE32 | 000001000 | 2 32-bit edge boundary processing |
| 140f | EDGE32L | 000001010 | 2 32-bit edge boundary processing, little endian |

| EXEMPLARY ASSEMBLY LANGUAGE SYNTAX |
|---|
| edge8 $reg_{rs1}, reg_{rs2}, reg_{rd}$ |
| edge8l $reg_{rs1}, reg_{rs2}, reg_{rd}$ |
| edge16 $reg_{rs1}, reg_{rs2}, reg_{rd}$ |
| edge16l $reg_{rs1}, reg_{rs2}, reg_{rd}$ |
| edge32 $reg_{rs1}, reg_{rs2}, reg_{rd}$ |
| edge32l $reg_{rs1}, reg_{rs2}, reg_{rd}$ |

*FIG. 10A.*

BIG ENDIAN

| EDGE SIZE | LSB | LEFT EDGE | RIGHT EDGE |
|---|---|---|---|
| 8 | 000 | 11111111 | 10000000 |
| 8 | 001 | 01111111 | 11000000 |
| 8 | 010 | 00111111 | 11100000 |
| 8 | 011 | 00011111 | 11110000 |
| 8 | 100 | 00001111 | 11111000 |
| 8 | 101 | 00000111 | 11111100 |
| 8 | 110 | 00000011 | 11111110 |
| 8 | 111 | 00000001 | 11111111 |
| 16 | 00x | 1111 | 1000 |
| 16 | 01x | 0111 | 1100 |
| 16 | 10x | 0011 | 1110 |
| 16 | 11x | 0001 | 1111 |
| 32 | 0xx | 11 | 10 |
| 32 | 1xx | 01 | 11 |

LITTLE ENDIAN

| EDGE SIZE | LSB | LEFT EDGE | RIGHT EDGE |
|---|---|---|---|
| 8 | 000 | 11111111 | 00000001 |
| 8 | 001 | 11111110 | 00000011 |
| 8 | 010 | 11111100 | 00000111 |
| 8 | 011 | 11111000 | 00001111 |
| 8 | 100 | 11110000 | 00011111 |
| 8 | 101 | 11100000 | 00111111 |
| 8 | 110 | 11000000 | 01111111 |
| 8 | 111 | 10000000 | 11111111 |
| 16 | 00x | 1111 | 0001 |
| 16 | 01x | 1110 | 0011 |
| 16 | 10x | 1100 | 0111 |
| 16 | 11x | 1000 | 1111 |
| 32 | 0xx | 11 | 01 |
| 32 | 1xx | 10 | 11 |

*FIG. 10B.* op = 10, op3 - 110110

| | opcode | opf | operation |
|---|---|---|---|
| 142a | ARRAY8 | 000010010 | convert 8-bit 3-D address to blocked byte address |
| 142b | ARRAY16 | 000010010 | convert 16-bit 3-D address to blocked byte address |
| 142c | ARRAY32 | 000010010 | convert 32-bit 3-D address to blocked byte address |

FIG. 11B.

| rs2 value | number of elements | rs2 value | number of elements |
|---|---|---|---|
| 0 | 64 | 3 | 512 |
| 1 | 128 | 4 | 1024 |
| 2 | 256 | 5 | 2048 |

| z integer | z fraction | y integer | y fraction | z integer | z fraction |
|---|---|---|---|---|---|
| 63 … 55 | 54 … 44 | 43 … 33 | 32 … 22 | 21 … 11 | 10 … 0 |

FIG. 11D.

8 bits:

| upper | | | middle | | | lower | | |
|---|---|---|---|---|---|---|---|---|
| Z | Y | X | Z | Y | X | Z | Y | X |

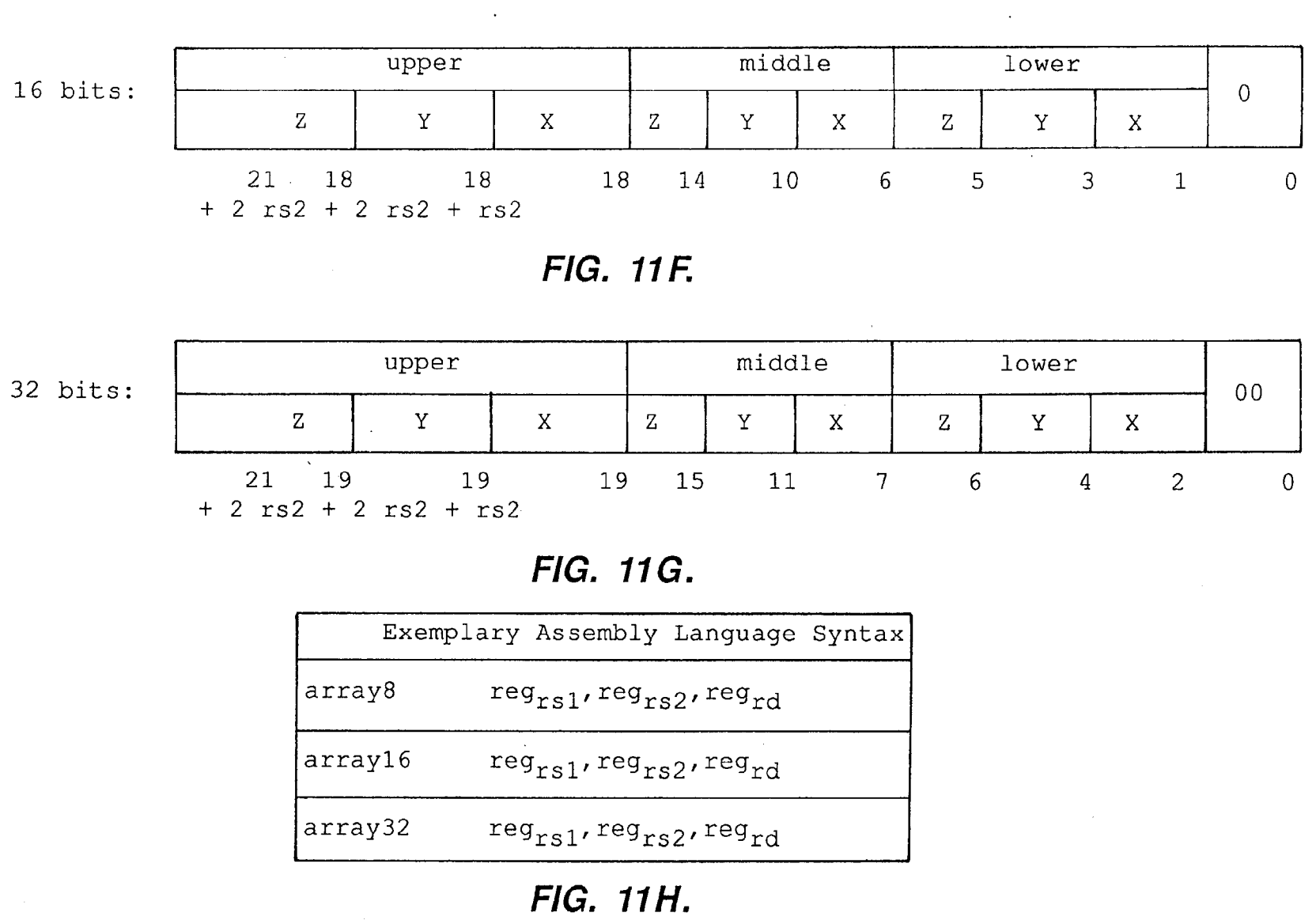

16 bits:

| upper | | | middle | | | lower | | | 0 |
|---|---|---|---|---|---|---|---|---|---|
| Z | Y | X | Z | Y | X | Z | Y | X | |

32 bits:

| upper | | | middle | | | lower | | | 00 |
|---|---|---|---|---|---|---|---|---|---|
| Z | Y | X | Z | Y | X | Z | Y | X | |

| Exemplary Assembly Language Syntax | |
|---|---|
| array8 | $reg_{rs1}, reg_{rs2}, reg_{rd}$ |
| array16 | $reg_{rs1}, reg_{rs2}, reg_{rd}$ |
| array32 | $reg_{rs1}, reg_{rs2}, reg_{rd}$ |

FIG. 11H.

CENTRAL PROCESSING UNIT WITH INTEGRATED GRAPHICS FUNCTIONS

This application is a continuation of and claims the benefit of U.S. application Ser. No. 09/244,187, filed Feb. 4, 1999, which is a divisional of U.S. application Ser. No. 08/638,390, filed Apr. 26, 1996 now abandoned, which is a continuation-in-part of U.S. application Ser. No. 08/236,572, filed Apr, 29, 1994, now U.S. Pat. No. 5,734,874.

FIELD OF THE INVENTION

The present invention relates to a superscalar central processing unit (CPU) having integrated graphics capabilities.

BACKGROUND OF THE INVENTION

The end result of most graphics applications is the generation of an image on a display or piece of paper. The basic elements of the image are the individual pixels and the location of each pixel. Thus, the basic values manipulated by a processing system are representations of the pixels and their locations, or addresses.

A typical representation of a pixel for a computer display uses RGB (red, green, blue) format. In this format, multiple bits for each of the R, G and B values indicates the intensity of the red, green and blue guns on the CRT. The combination of the different intensities gives the desired colors. In an alternate format, rather than specifying the intensity of each gun directly, the values could be used to index into a color look-up table (LUT) which then provides the desired intensity value for each gun of a CRT. One typical format uses 8 bits for each of the R, G and B values. In some formats, another field, called alpha ($\alpha$) is used to represent either the transparency or relative coverage of an object over the pixel for 3-D applications. In 3-D applications, depending on the viewpoint, which pixel at of a particular X, Y location is to be displayed must be chosen amongst a number of planes of pixels in the Z plane. If a pixel in front is relatively transparent, the pixel behind might be allowed to show through, giving some combination of the colors of the two pixels.

Alternate types of pixel representations are used. For instance, CYM (cyan [light blue], magenta [purplish-red], and yellow) are typically used for printers, with a subtractive operation between the intensities, rather than additive as for RGB. Yet another representation, YUV, is used to give a luminance value and two values of chroma, and was developed for broadcast television to be compatible with black and white TVs which only have a luminance value. Black and white monitors use a grey scale, which is specified by the intensity of each pixel.

The display of an image in graphics processing requires producing the appropriate pixel values for each pixel at each address in a frame buffer, which stores information to be displayed on the screen. The pixel values at each location in the frame buffer may be created by various rendering techniques, which are the operations for creating the image in the frame buffer. Rendering will typically use a number of primitives, which are basic building blocks of the pictures, such as points, lines, polygons, circles, etc.

For 3-D images, additional factors include the particular viewpoint used, with appropriate lighting effects, such as shading and reflection. In addition, particular objects may be colored or textured to make them more realistic. The lighting and shading effects are accomplished by varying the intensities of the individual pixels in the area to be shaded or have a reflection. This typically involves, at the processing level, the multiplication of pixel values by a constant. This is one example of a graphics intensive operation in which many pixels may be required to be multiplied by the same or varying constants.

In 3-D graphics, an image is generated in three dimensions. This is stored in memory as an X, Y plane representing the first face of a cube, with a series of slices through the cube representing different Z positions, each having its own X, Y plane representation. When viewing the image on the display, the viewpoint must be selected to determine which X, Y plane is visible at any particular viewpoint. This typically involves a comparison operation in which the pixels' Z positions are compared to each other to determine which to put in the frame buffer for display. In addition, the pixel position may be compared to the viewpoint Z position. Thus, extensive comparison operations are another attribute of graphics manipulation.

In addition to determining which image is in front for 3-D applications, images may be clipped for a variety of reasons. For instance, if a triangle is partially behind a square, it may be most efficient to render the triangle, then render the square, and clip the triangle where it is hidden by the square. In addition, windows may be generated, or the edge of a screen may vary depending upon the scale of an images to be displayed, thus creating additional boundaries where an image must be cut off. Thus, it is often necessary to compare a particular pixel position, or address, to an edge boundary or clipping position.

In video graphics, there are additional complications for processing images. In particular, a large number of different images must be generated very rapidly, thus requiring fast throughput plus large amounts of memory. Compression techniques are thus very important in eliminating the amount of memory. One such compression technique involves motion estimation. In movement from one frame to another, often most of the image will not change, with only a portion moving. The portion moving, or the whole if it is moving, often will typically be shifted, and thus storage can be saved by indicating the amount of shift rather storing a whole new image. The amount of movement is typically determined by comparing a block of pixels in one image to those in another image frame, and moving the positions of the blocks around relative to each other until a best match is obtained.

Other considerations in video include the need to deal with images in multiple formats, and the need to convert one format into another to make it compatible with other images.

There are three major barriers to achieving high performance in graphics computer systems. The first barrier is in floating point processing throughput. Graphics applications typically perform large amount of figure manipulation operations such as transformations and clippings using floating point data. The second barrier is in integer or fixed point processing throughput. Graphics applications also typically perform large amount of display operations such as scan conversion and color interpolation using integer or fixed point data. The third barrier is in memory references. The above-described operations typically require large amount of memory references for reading from and writing into, for example, the frame and Z-buffers.

Historically, the CPU's in early prior art computer systems are responsible for both graphics as well as non-graphics functions. No special hardware are provided to assist these early CPUs in performing the large amount of floating and fixed point processing, nor memory references. While the designs of these early prior art computer systems are simple, their performance are typically slow.

Some later prior art computer systems provide auxiliary display processors. The auxiliary display processors would off load these later CPUs from some of the display related operations. However, these later CPUs would still be responsible for most of the graphics processing. Typically, the bandwidth of the system buses of these later prior art computer systems are increased correspondingly to accommodate the increased amount of communications between the processors over the buses. The auxiliary display processors may even be provided with their own memory to reduce the amount of memory contentions between the processors. While generally performance will increase, however, the approach is costly and complex.

Other later prior art computer systems would provide auxiliary graphics processors with even richer graphics processors would off load the CPUs of these later prior art computer systems from most of the graphics processing. Under this approach extensive dedicated hardware as well as sophisticated software interface between the CPUs and the auxiliary graphics processors will have to be provided. While performance will increase even more, however, the approach is even more costly and more complex than the display processor approach.

In the case of microprocessors, as the technology continues to allow more and more circuitry to be packaged in a small area, it is increasingly more desirable to integrate the general purpose CPU with built-in graphics capabilities instead. Some modern prior art computer systems have begun to do that. However, the amount and nature of graphics functions integrated in these modern prior art computer systems typically are still very limited. Particular graphics functions known to have been integrated include frame buffer checks, add with pixel merge, and add with Z-buffer merge. Much of the graphics processing on these modern prior art systems remain being processed by the general purpose CPU without additional built-in graphics capabilities, or by the auxiliary display/graphics processors.

The performance of a CPU in doing graphics operations may be affected by the structure of the CPU itself. For instance, most modern CPUs employ a cache memory and a TLB (translation look-aside buffer). The cache memory is a small memory storing frequently accessed instructions or data by a computer program. This is based on the realization that many applications programs do loops or repeatedly access data which is in proximity to each other. Thus a speed savings can be achieved by having a small amount of data and instructions on the microprocessor chip itself or an external, dedicated cache which is more quickly accessed than main memory. However, in graphics functions, the cache size may be overwhelmed in processing a large image. The TLB is a small cache of page translations from a virtual address used by a program to a physical address in memory, and misses may occur more often for graphics operations because of the amount of data that needs to be addressed.

In RISC (reduced instruction set computing) processors a superscalar approach is used in which multiple, relatively simple, instructions are executed in parallel. This requires a number of parallel execution units for performing these instructions. In addition, these processors are typically pipelined, with each instruction entering the pipeline to be followed by another instruction, and thus multiple instructions are being processed in the pipeline at the same time. Accordingly, the design of the processor requires that the execution units and pipelines be constructed so that it is unlikely that any two sequential instructions will require the same execution unit, thus not allowing them to be issued in parallel.

One implementation of a RISC microprocessor incorporating graphics capabilities is the Motorola MC88110. This microprocessor, in addition to its integer execution units, and multiply, divide and floating point add units, adds two special purpose graphics units. The added graphics units are a pixel add execution unit, and a pixel pack execution unit. The Motorola processor allows multiple pixels to be packed into a 64-bit data path used for other functions in the other execution units. Thus, multiple pixels can be operated on at one time. The packing operation in the packing execution unit packs the pixels into the 64-bit format. The pixel add operation allows the adding or subtracting of pixel values from each other, with multiple pixels being subtracted at one time in a 64-bit field. This requires disabling the carry normally generated in the adder on each 8-bit boundary. The Motorola processor also provides for pixel multiply operations which are done using a normal multiply unit, with the pixels being placed into a field with zeros in the high order bits, so that the multiplication result will not spill over into the next pixel value representation.

The Intel I860 microprocessor incorporated a graphics unit which allowed it to execute Z-buffer graphics instructions. These are basically the multiple operations required to determine which pixel should be in front of the others in a 3-D display.

SUMMARY OF THE INVENTION

The present invention provides an optimized, superscalar microprocessor architecture for supporting graphics operations in addition to the standard microprocessor integer and floating point operations. Independent execution paths are provided for different graphics instructions to allow parallel execution of instructions which commonly occur together. The invention also optimizes the use of register file accesses to avoid, as much as possible, interference between graphics instructions needing to access a register file and other instruction accesses which would occur in combination with graphics instructions, thereby avoiding pipeline stalls and allowing parallel execution.

In a preferred embodiment, a number of graphics instructions are provided, and corresponding logic is added, to the floating point units of a superscalar architecture. The floating point register file, which is separate from the integer register file, is used for most graphics accesses. In particular, additional circuitry and instructions are allocated between a floating point adder and a floating point multiply unit to maximize throughput.

In one embodiment, the floating point adder is modified to add logic units, which are already in the integer unit, but are added to the floating point unit to allow access of the FP register file for logical operations. The FP unit is also modified to add multiplexing circuitry which can perform expand/merge functions and alignment functions.

A floating point multiply unit is modified by adding circuitry specifically designed for performing pixel distance computations, packing operations, and compare operations for graphics. Additionally, the floating point paths are extended from 56 bits (53 plus GRS) to 64 bits to allow multiple pixels to be processed in parallel.

In another aspect of the present invention, modifications are made to the microprocessor, and instructions are provided, to limit the memory accesses required for graphics operations. A "partial store" instruction is provided, with appropriate circuitry in the load/store unit, to allow designated bytes in a 64-bit block to be stored at a destination.

The bytes can be designated using a mask, which is created by a compare operation. This could be used, for example, in doing a Z compare to determine which pixel is in front in a 3-D rendering operation, and only storing the pixels which are not obscured. This one operation avoids the need for multiple pixel accesses and compare operations with subsequent writing into the destination, thus greatly reducing the number of memory accesses required.

Short load and store operations are provided to load or store less than an entire 64-bit register. One or more bytes could be loaded at a time into a 64-bit register until the register is full. Only then would be contents of the register be written to memory, thus minimizing the number of memory accesses.

In another aspect of the invention, array instructions are provided to remap the address space into a 3-D blocked address space. Addresses are arranged according to the XYZ coordinates in a series of small blocks, rather than describing an entire XY plane first, and then incrementing the Z amount. This addressing mode provides a greater likelihood of a hit in the on-chip cache and in the TLB, thus minimizing the need to go to an external cache or main memory when the data being processed is localized in three dimensions. This is useful, for instance, in 3-D medical imaging applications, such as CAT scans. In a preferred embodiment, additional logic is added to the integer execution unit to implement the necessary address transformations according to these instructions.

The present invention also provides a number of other unique instructions and associated circuitry for supporting graphics operations. Edge handling instructions are provided to generate masks used to indicate the edge (such as a window boundary) of an image. The floating point adder is modified in a preferred embodiment to support alignment instructions which realign graphics values on 64-bit boundaries.

For a fuller understanding of the present invention, reference should be made to following description taken in conjunction with the accompanying drawings.

BRIEF DESCRIPTION OF THE DRAWINGS

FIGS. 6*a*–6*c* illustrate the graphics data formats, the graphics instruction formats, and the graphic instruction groups in further detail.

FIGS. 7*a*–7*c* illustrate the graphics data alignment instructions and circuitry in further detail.

FIGS. 9*a*–9*b* illustrate the graphics data pixel distance computation instruction and circuitry in further detail.

FIGS. 10*a*–10*b* illustrate the graphics data edge handling instructions in further detail.

FIGS. 11*a*–11*i* illustrate the graphics data 3-D array addressing instructions and circuitry in further detail.

DESCRIPTION OF THE PREFERRED EMBODIMENT

In the following description, for purposes of explanation, specific numbers, materials and configurations are set forth in order to provide a thorough understanding of the present invention. However, it will be apparent to one skilled in the art that the present invention may be practiced without the specific details. In other instances, well-known systems are shown in diagrammatic or block diagram form in order not to obscure the present invention.

Overall CPU Architecture

Figure 1:
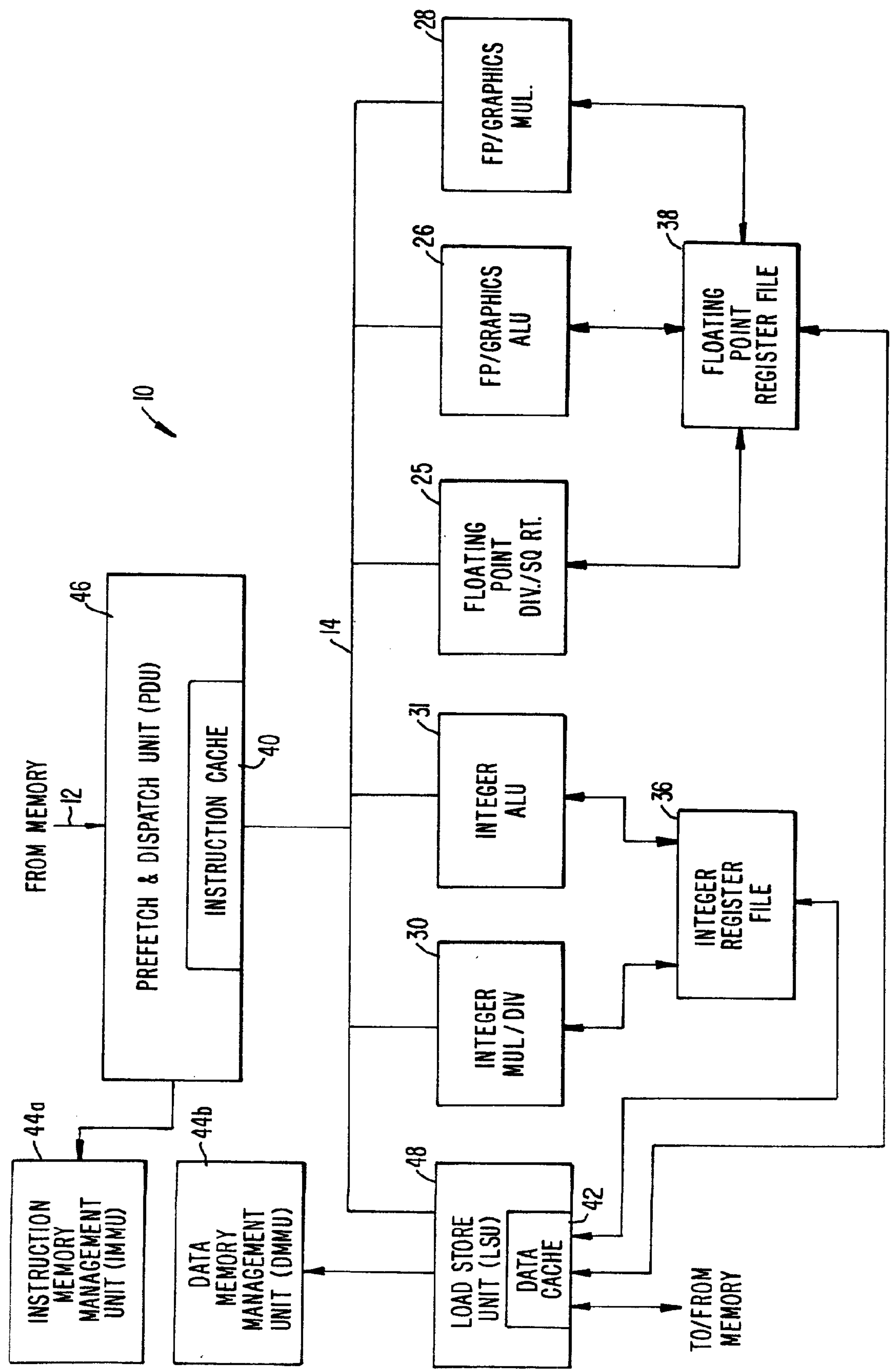
FIG. 1 illustrates the CPU of an exemplary graphics computer system incorporating the teachings of the present invention.

Referring now to FIG. 1, a block diagram illustrating the CPU of an exemplary graphics computer system incorporating the teachings of the present invention is shown.

As illustrated, a CPU 10 includes a prefetch and dispatch unit (PDU) 46 connected to an instruction cache 40. Instructions are fetched by this unit from either the cache or main memory on a bus 12 with the help of an instruction memory management unit (IMMU) 44*a*. Data is fetched either from main memory or from a data cache 42 using a load storage unit (LSU) 48 working with a data memory management unit (DMMU) 44*b*.

PDU 46 issues up to four instructions in parallel to multiple pipelined execution units along a pipeline bus 14. Integer operations are sent to one of two integer execution units (IEU), an integer multiply or divide unit 30 and an integer ALU 31. These two units share access to an integer register file 36 for storing operands and results of integer operations.

Separately, three floating point operation units are included. A floating point divide and square root execution unit 25, a floating point/graphics ALU 26 and a floating point/graphics multiplier 28 are coupled to pipeline bus 14 and share a floating point register file 38. The floating point register file stores the operands and results of floating point and graphics operations.

The present invention uniquely modifies a floating point adder and floating point multiplier to include graphics capability. The choice of which hardware and functionality is added to the floating point adder vs. the floating point multiplier unit was optimized to improve pipeline throughput and limit memory bandwidth demands, as described in more detail below with respect to the individual execution units. In addition, many of the graphic operations and hardware are combined with the floating point units to share the floating point register file, thereby avoiding conflict with accesses to the integer register file by the integer execution units. Although graphics operations are typically fixed point type of operations, thus suggesting an integer unit might be more logical, the combination with a floating point unit not only eliminates conflicts with the integer register file, but also provides more precision by allowing the larger floating point data path to be used.

The graphics capability added to the floating point path allows integer operations to be issued at the same time along pipeline bus 14, thus processing in parallel. For example, for motion estimation, addition operations are required in conjunction with comparing operations for determining how much an image has shifted, as we will discuss below in connection with the pixel distance instruction. In another example, for a pixel packing operation, addition operations are also required. In another example, address computations may be done in the integer unit in combination with edge handling instructions for determining the edge of a window or other feature.

The data path through the floating point units 26 and 28 has been extended to 64 bits in order to be able to accommodate 8—8 bit pixel representations, (or 4–16 bit, or 2–32 bit representations) in parallel. Thus, the standard floating point path of 53 bits plus 3 extra bits (guard, round and sticky or GRS) has been expanded to accommodate the graphics instructions in accordance with the present invention.

Additionally, the IEU also performs a number of graphics operations, and appends address space identifiers (ASI) to the addresses of load/store instructions for the LSU 48, identifying the address spaces being accessed. LSU 48 generates addresses for all load and store operations. LSU 48 also supports a number of load and store operations, specifically designed for graphics data. Memory references are made in virtual addresses. The MMUs 44*a*–44*b* include translation look-aside buffer (TLBs) to map virtual addresses to physical addresses.

Two Partitioned Graphics Execution Paths

Figure 2:
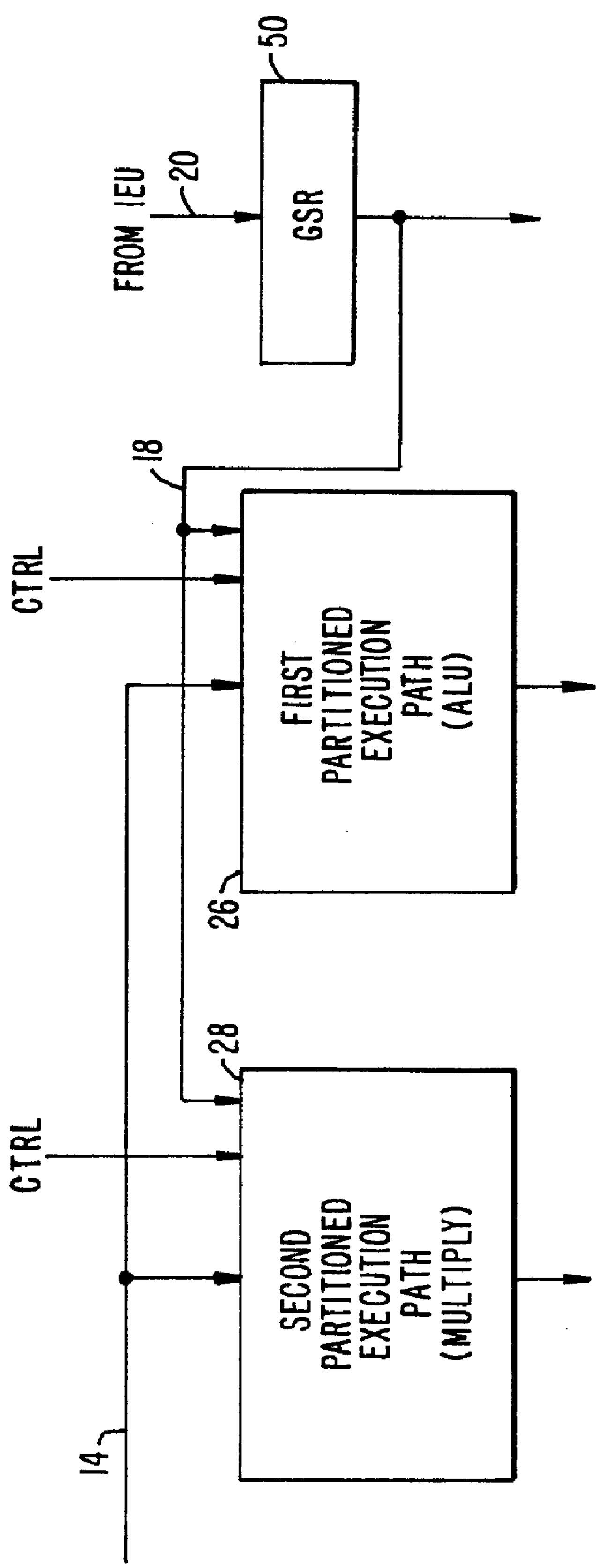
FIG. 2 illustrates the two partitioned execution paths of one embodiment of the graphics circuitry added in FIG. 1.

FIG. 2 shows the floating point/graphics execution units 26 and 28 in more detail. FIG. 2 illustrates that these provide two partitioned execution paths for graphics instructions, a first partitioned execution path in unit 26 and a second partitioned execution path in unit 28. Both of these paths are connected to the pipeline bus 14 connected to the prefetch and dispatch unit 46. As will be described in more detail below, the division of hardware and instructions between two different execution paths allows two independent graphics instructions to be executed in parallel for each cycle of a pipeline. The partitioning of instructions and hardware between the two paths has been done to optimize throughput of typical graphics applications.

Also shown is a graphics status register (GSR) 50. This register is provided external to the two paths, since it stores the scale factor and alignment offset data used by graphics instructions in both execution paths. Each execution path is provided the information in the graphics status register along bus 18. The graphics status register is written to along a bus 20 by the IEU.

Graphics Status Register

Figure 3:
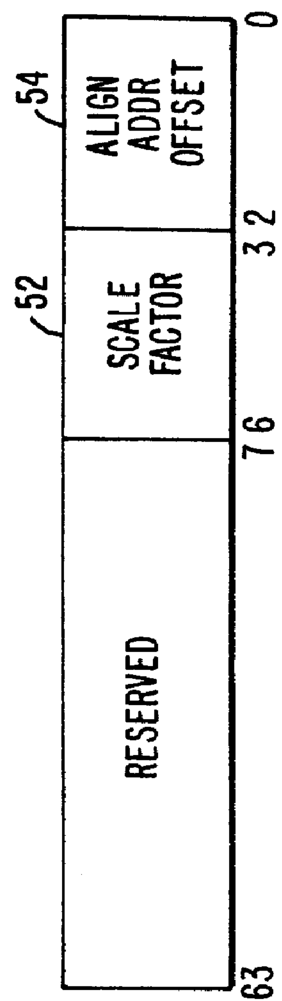
FIG. 3 illustrates the Graphics Status Register (GSR).

Referring now to FIG. 3, a diagram illustrating the relevant portions of one embodiment of the graphics status register (GSR) is shown. In this embodiment, the GSR 50 is used to store an offset in bits 0–2, and a scale factor in bits 3–8, with the remaining bits reserved. The offset is the least significant three bits of a pixel address before alignment (alignaddr_offset) 54, and the scaling factor is used for pixel formatting (scale_factor) 52. The alignaddr_offset 54 is stored in bits GSR[2:0], and the scale_factor 52 is stored in bits GSR[6:3]. As will be described in more detail below, two special instructions RDASR and WRASR are provided for reading from and writing into the GSR 50. The RDASR and WRASR instructions and the usage of alignaddr_offset 54 and scale_factor 52 will be described in further detail below.

FP/Graphics ALU 26

Figure 4:
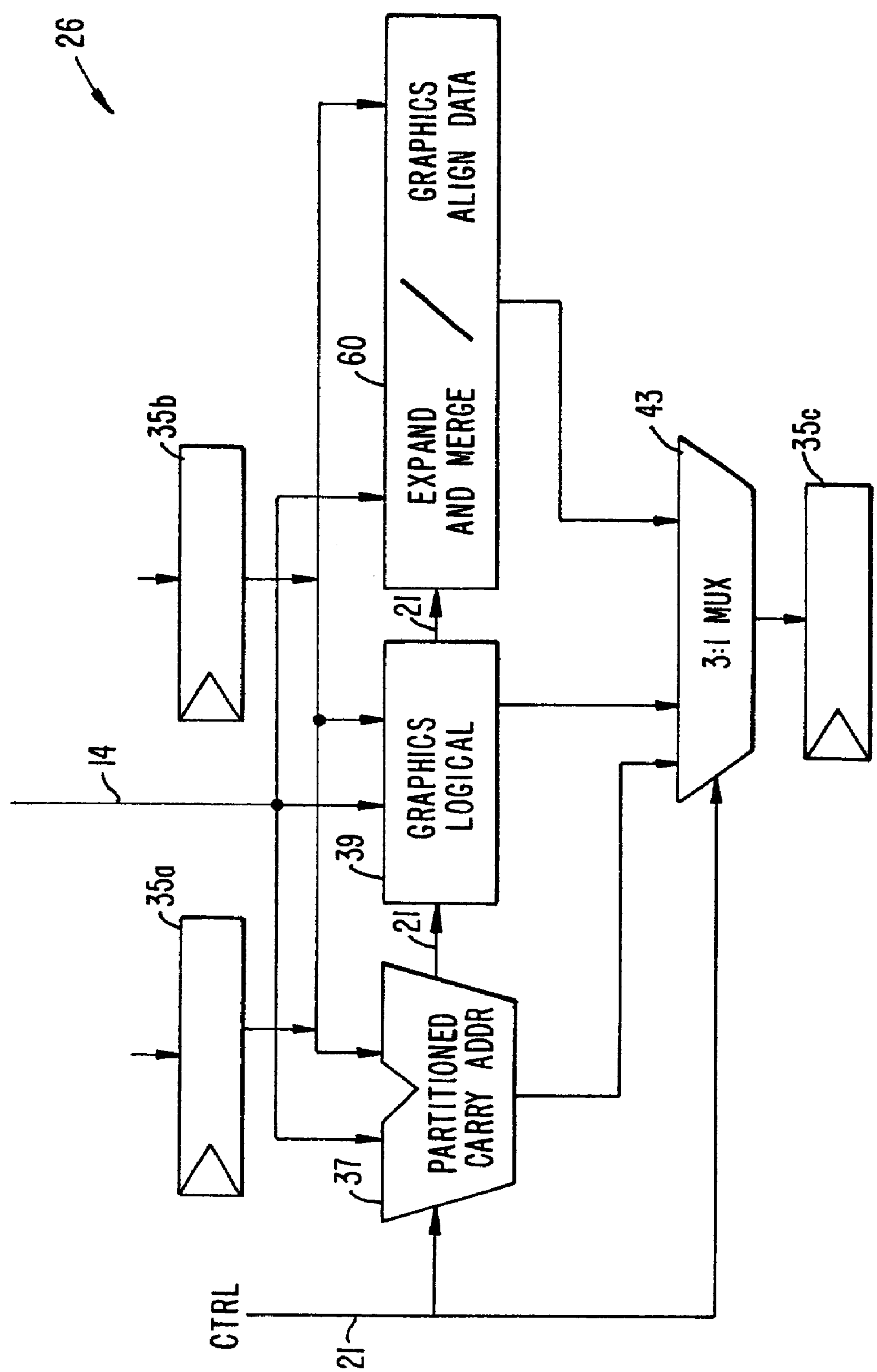
FIG. 4 illustrates the first ALU partitioned execution path of FIG. 2 in further detail.

Referring now to FIG. 4, a block diagram illustrating the relevant portions of one embodiment of the first partitioned execution path in unit 26 is shown.

Pipeline bus 14 provides the decoded instructions from PDU 46 to one of three functional circuits. The first two functional units, partitioned carry adder 37 and graphics logical circuit 39, contain the hardware typically contained in a floating point adder and an integer logic unit. The circuitry has been modified to support graphics operations as discussed in more detail below. An additional circuit 60 has been added to support both graphics expand and merge operations and graphics data alignment operations. Control signals on lines 21 select which circuitry will receive the decoded instruction, and also select which output will be provided through a multiplexer 43 to a destination register 35*c*. Destination register 35*c*, and operand register 35*a* and 35*b* are illustrations of particular registers in the floating point register file 38 of FIG. 1.

At each dispatch, the PDU 46 may dispatch either a graphics data partitioned add/subtract instruction, a graphics data alignment instruction, a graphics data expand/merge instruction or a graphics data logical operation to unit 26. The partitioned carry adder 37 executes the partitioned graphics data add/subtract instructions, and the expand and merge/graphics data alignment circuit 60 executes the graphics data alignment instruction using the alignaddr_offset stored in the GSR 50. The graphics data expand and merge/graphics data alignment circuit 60 also executes the graphics data merge/expand instructions. The graphics data logical operation circuit 39 executes the graphics data logical operations.

The functions and constitutions of the partitioned carry adder 37 are similar to simple carry adders found in many integer execution units known in the art, except the hardware are replicated multiple times to allow multiple additions/subtractions to be performed simultaneously on different partitioned portions of the operands. Additionally, the carry chain can be optionally broken into smaller chains as described in detail below with reference to a multiplier in FIG. 6*d*.

The functions and constitutions of the graphics data logical operation circuit 39 are similar to logical operation circuits found in many integer execution units known in the art, except the hardware are replicated multiple times to allow multiple logical operations to be performed simultaneously on different partitioned portions of the operands. Thus, the graphics data logical operation circuit 39 will also not be further described.

The graphics data alignment circuit 60 will be described in further detail below.

FP/Graphics Multiply Unit 28

Figure 5:
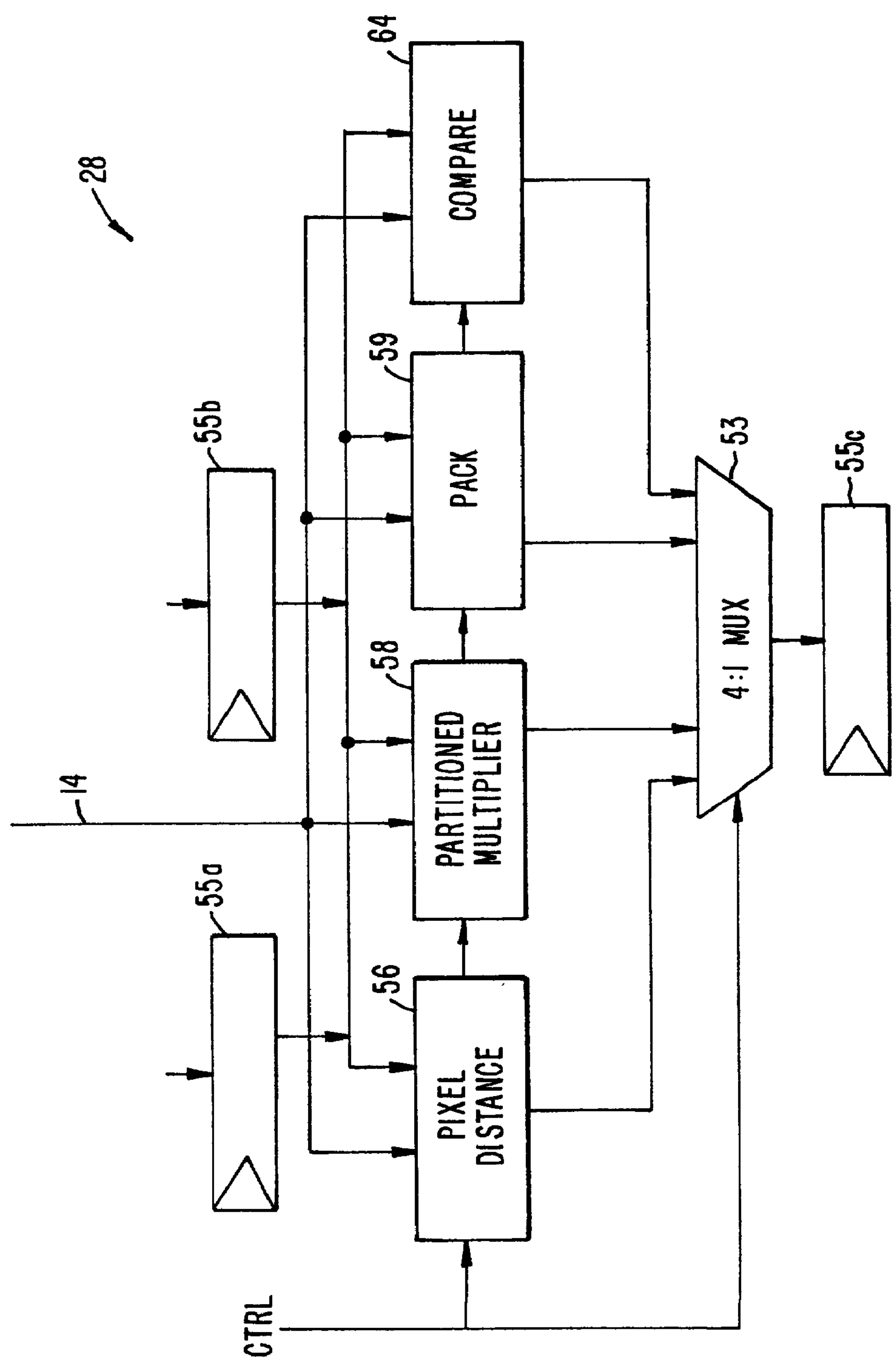
FIG. 5 illustrates the second multiply partitioned execution path of FIG. 2 in further detail.

Referring now to FIG. 5, a block diagram illustrating the relevant portion of one embodiment of the FP/graphics multiply unit 28 in further detail is shown. In this embodiment, multiply unit 28 comprises a pixel distance computation circuit 56, a partitioned multiplier 58, a graphics data packing circuit 59, and a graphics data compare circuit 64, coupled to each other as shown. Additionally, a number of registers 55*a*–55*c* (in floating point register file 38) and a 4:1 multiplexer 53 are coupled to each other and the previously-described elements as shown. At each dispatch, the PDU 46 may dispatch either a pixel distance computation instruction, a graphics data partitioned multiplication instruction, a graphics data packing instruction, or a graphics data compare instruction to unit 28. The pixel distance computation circuit 56 executes the pixel distance computation instruction. The partitioned multiplier 58 executes the graphics data partitioned multiplication instructions. The graphics data packing circuit 59 executes the graphics data packing instructions. The graphics data compare circuit 64 executes the graphics data compare instructions.

The functions and constitutions of the partitioned multiplier 58, and the graphics data compare circuit 64 are similar to simple multipliers and compare circuits found in many integer execution units known in the art, except the hardware are replicated multiple times to allow multiple multiplications and comparison operations to be performed simultaneously on different partitioned portions of the operands. Additionally, multiple multiplexers are provided to the partitioned multiplier for rounding, and comparison masks are generated by the comparison circuit 64. The partitioned multiplier 58 is described in more detail below, but the graphics data compare circuit 64 will not be further described.

The pixel distance circuit 56 and the graphics data pack circuit 59 will be described in further detail below.

The present invention is being described with an embodiment of the graphics circuitry having two independent partitioned execution paths, and a particular allocation of graphics instruction execution responsibilities among the execution paths. However, based on the descriptions to follow, it will be appreciated that certain aspects of the present invention may be practiced with one or more independent partitioned execution paths, and the graphics instruction execution responsibilities allocated in any number of manners.

Data Formats

Figure 6A:
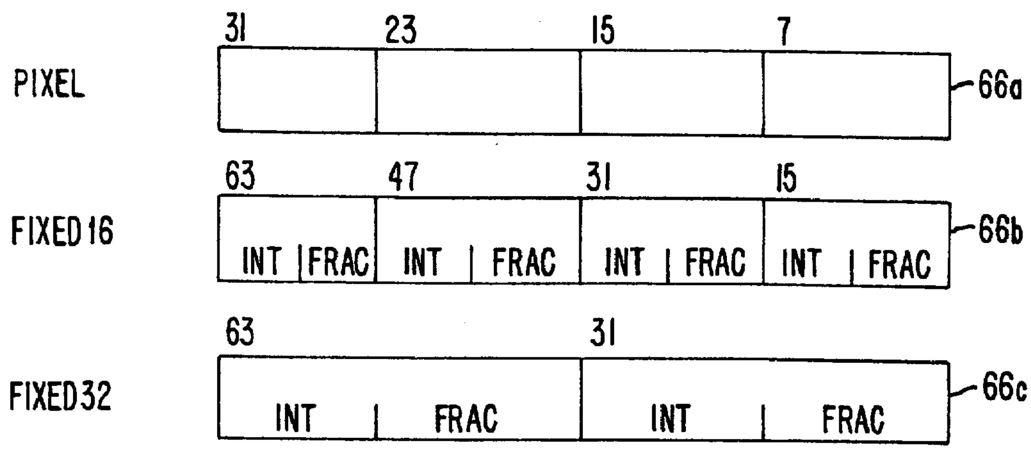
Figure 6B:
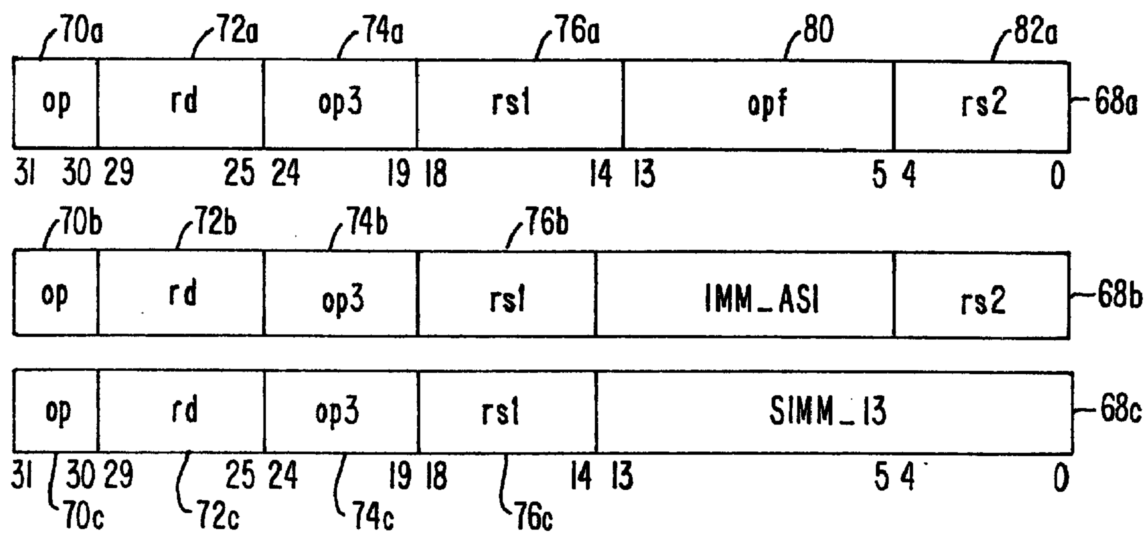

Referring now to FIGS. 6*a*–6*c*, three diagrams illustrating the graphics data formats, the graphics instruction formats, and the graphics instructions are shown. As illustrated in FIG. 6*a*, the exemplary CPU 10 supports three graphics data formats, an eight bit format (Pixel) 66*a*, a 16 bit format (Fixed16) 66*b*, and a 32 bit format (Fixed32) 66*c*. Thus, four pixel formatted graphics data are stored in a 32-bit word, 66*a*, whereas either four Fixed16 or two Fixed32 formatted graphics data are stored in a 64-bit word 66*b* or 66*c*. Image components are stored in either the Pixel or the Fixed16 format 66*a* or 66*b*. Standard audio data formats are also supported. Intermediate results are stored in either the Fixed16 or the Fixed32 format 66*b* or 66*c*. Typically, the intensity values of a pixel of an image, e.g., the alpha, green, blue, and red values (α, G, B, R), are stored in the Pixel format 66*a*. These intensity values may be stored in a band interleaved format where the various color components of a point in the image are stored together, or in a band sequential format where all of the values for one component are stored together. The Fixed16 and Fixed32 formats 66*b*–66*c* provide enough precision and dynamic range for storing intermediate data computed during filtering and other simple image manipulation operations performed on pixel data. Graphics data format conversions are performed using the graphics data pack, expand, merge, and multiply instructions described below.

Instruction Formats

As illustrated in FIG. 6*b*, the CPU 10 supports three graphics instruction formats 68*a*–68*c*. Regardless of the instruction format 68*a*–68*c*, the two most significant bits [31:30] 70*a*–70*c* provide the primary instruction format identification, and bits [24:19] 74*a*–74*c* provide the secondary instruction format identification for the graphics instructions. Additionally, bits [29:25] (rd) 72*a*–72*c* identify the destination (third source) register of a graphics (block/partial conditional store) instruction, whereas, bits [18:14] (rs1) 76*a*–76*c* identify the first source register of the graphics instruction. For the first graphics instruction format 68*a*, bits [13:5] (opf) 80 and bits [4:0] (rs2) 82*a* identify the op codes and the second source registers for a graphics instruction of that format. For the second and third graphics instruction formats 68*b*–68*c*, bits[13:5] (imm_asi) and bits [13:0] (simm_13), respectively, may optionally identify the ASI (address space identifiers). Lastly, for the second graphics instruction format 68*b*, bits[4:0] (rs2) further provide the second source register for a graphics instruction of that format (or a mask for a partial conditional store).

Graphics Instructions

As illustrated in FIG. 6*c*, the CPU 10 supports a number of GSR related instructions 200, a number of partitioned add/subtract/multiplication instructions 202 and 208, a number of graphics data alignment instructions 204, a number of pixel distance computation instructions 206, a number of graphics data expand/merge instructions 210 and packing instructions 212, a number of graphics data logical and compare instructions 214 and 216, a number of edge handling and 3-D array access instructions 218 and 220, and a number of memory access instructions 222. The execution unit used for each instruction type is shown.

GSR Read and Write

The GSR related instructions 200 include a RDASR and a WRASR instruction for reading and writing the alignaddr_offset and the scale_factor from and into the GSR 50. The RDASR and WRASR instructions are executed by the IEU 30. Typically, once written to, the offset and scale factor stored in GSR 50 will not change for a particular graphics application. The RDASR and WRASR instructions are similar to other CPU control register read/write instructions, thus will not be further described.

Add/Subtract Instructions

The graphics data partitioned add/subtract instructions 202 include four partitioned graphics data addition instructions and four partitioned graphics data substraction instructions for simultaneously adding and subtracting four 16-bit, two 16-bit, two 32-bit, and one 32-bit graphics data, respectively. These instructions add or subtract the corresponding fixed point values in the rs1 and rs2 registers of the floating point register file, and correspondingly place the results in the rd register of the floating point register file. As described earlier, the graphics data partitioned add/subtract instructions 202 are executed by the partitioned carry adder 37 in execution unit 26.

Multiply Instructions

Figure 6D:
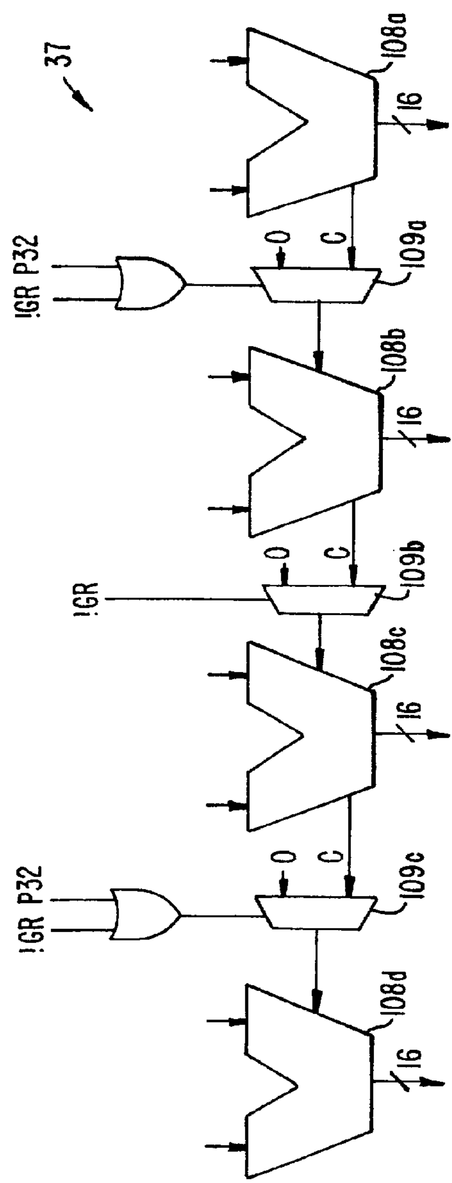
FIG. 6*d* illustrates a partitioned multiply with a controllable carry forward according to one embodiment of the multiplier of FIG. 5.

The partitioned multiplier 58 of FIG. 5 used for the multiplication instructions 208 is illustrated in more detail in FIG. 6*d*. As FIG. 6*d* shows, the multiplier is partitioned into four units 108*a*–108*d*. In-between the multiplier units are multiplexers 109*a*–109*c*. These multiplexers will either propagate the carry bit to the next multiplier unit, or will inhibit the propagating of the carry bit, providing a zero input instead. When the carry bit is propagated, the multiplier units act as a single 64-bit multiplier. Alternately, it can be broken into two 32-bit multipliers by inhibiting the carry bit with multiplexer 109*b* with the control signal !GR (! being the C language NOT operator). Thus, when it is not a graphics operation, the carry is allowed to propagate, otherwise it is inhibited. The selection logic for multiplexers 109*a* and 109*c* will inhibit the carry if it is a graphics operation and it is not a 32-bit operation.

Figure 6E:
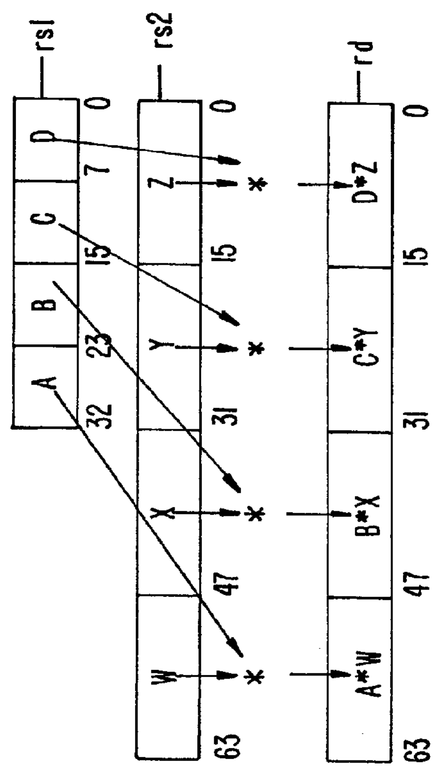
FIG. 6*e* illustrates a multiple pixel multiply operation according to one embodiment of the invention.

The graphics data partitioned multiplication instructions 208 include seven partitioned graphics data multiplication instructions for simultaneously multiplying either two or four 8-bit graphics data with another two or four corresponding 16-bit graphics data. FIG. 6*e* shows an example where a FMUL8×16 instruction multiplies four 8-bit graphics data (A–D) in the rs1 register by four corresponding 16-bit graphics data (w–z) in the rs2 register. For each product, the upper 16 bits are stored in the corresponding positions of the rd register (the rs1, rs2 and rd registers are in the floating point register file). A FMUL8×16AU and a FMUL8×16AL instruction multiplies the four 8-bit graphics data in the rs1 register by the upper and the lower halves of the 32-bit graphics data in the rs2 register, respectively. Similarly, for each product, the upper 16 bits are stored in the corresponding positions of the rd register.

A FMUL8SU×16 instruction multiplies the four upper 8-bits of the four 16-bit graphics data in the rs1 register by the four corresponding 16-bit graphics data in the rs2 register. Likewise, for each product, the upper 16 bits are stored in the corresponding positions of the rd register. A FMUL8UL×16 instruction multiplies the four lower 8-bits of the four 16-bit graphics data in the rs1 register by the four corresponding 16-bit graphics data in the rs2 register. For each product, the sign extended upper 8 bits are stored in the corresponding positions of the rd register.

A FMULD8SU×16 instruction multiplies the two 16-bit graphics data in the rs1 register by the two corresponding 16-bit graphics data in the rs2 register. For each product, the 24 bits are appended with 8-bit of zeroes and stored in the corresponding positions of the rd register. A FMULD8UL×16 instruction multiplies the two lower 8-bits of the two 16-bit graphics data in the rs1 register by the two corresponding 16-bit graphics in the rs2 register. For each product, the 24-bits are sign extended and stored in the corresponding positions of the rd register.

As described earlier, the graphics data partitioned multiplication instructions 208 are executed by the partitioned multiplier 58 in execution unit 28.

Expand and Merge Instruction

The graphics data expand and merge instructions 210 include a graphics data expansion instruction, and a graphics data merge instruction, for simultaneously expanding four 8-bit graphics data into four 16-bit graphics data, and interleavingly merging eight 8-bit graphics data into four 16-bit graphics data, respectively. A FEXPAND instruction takes four 8-bit graphics data in the rs2 register, left shifts each 8-bit graphics data by 4 bits, and then zero-extend each left shifted graphics data to 16-bits. The results are correspondingly placed in the rd register. A FPMERGE instruction interleavingly merges four 8-bit graphics data from the rs1 register and four 8-bit graphics data from the rs2 register, into a 64 bit graphics datum in the rd register. As described earlier, the graphics data expand and merge instructions 210 are executed by the expand/merge portions of the graphics data expand/merge and alignment circuit 60 in execution unit 28. The circuitry is basically a number of controlled multiplexers.

Logical Operations

The graphics data logical operation instructions 214 include thirty-two logical operation instructions for performing logical operations on graphics data. Four logical operations are provided for zeroes filling or ones filling the rd register in either single or double precision. Four logical operation instructions are provided for copying the content of either the rs1 or rs2 register in the rd register in either single or double precision. Four logical operation instructions are provided for negating the content of either the rs1 or rs2 register and storing the result into the rd register in either single or double precision. Some logical operations are provided to perform a number of Boolean operations against the content of the rs1 and rs2 registers in either single or double precision, and storing the Boolean results into the rd register. Some of these Boolean operations are performed after having either the content of the rs1 or the rs2 register negated first. As described earlier, these graphics data logical operation instructions 214 are executed by the graphics data logical operation circuit 39 in execution unit 26.

Data Compare Instructions

The graphics data compare instructions 216 include eight graphics data compare instructions for simultaneously comparing four pairs of 16-bit graphics data or two pairs of 32-bit graphics data. The comparisons between the graphics data in the rs1 and rs2 registers include greater than, less than, not equal, and equal. Four or two result bits are stored in the least significant bits in the rd register. Each result bit is set if the corresponding comparison is true. Complimentary comparisons between the graphics data, i.e., less than or equal to, and greater than or equal to, are performed by swapping the graphics data in the rs1 and rs2 registers. As described earlier, these graphics data compare instructions 216 are executed by the graphics data compare circuit 64 in execution unit 28.

The compare logic is placed in the same execution unit as the multiplier, rather than with the adder, in order to optimize instruction throughput. There are a number of operations where a compare and an add need to be done simultaneously. For example, in the rendering of a line, the color may be added using the adder while at the same time a comparison is done to determine which pixel is in front in the Z plane.

Data Alignment Instructions

Figure 7B:
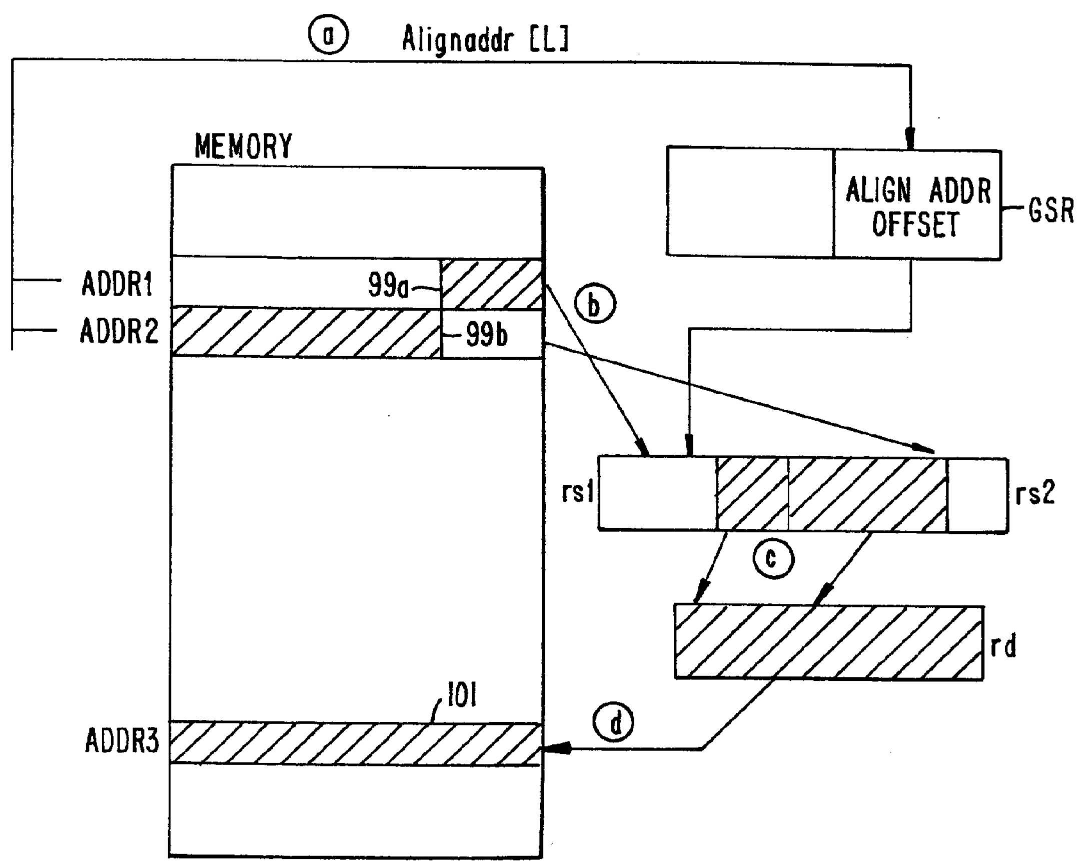
Figure 7C:
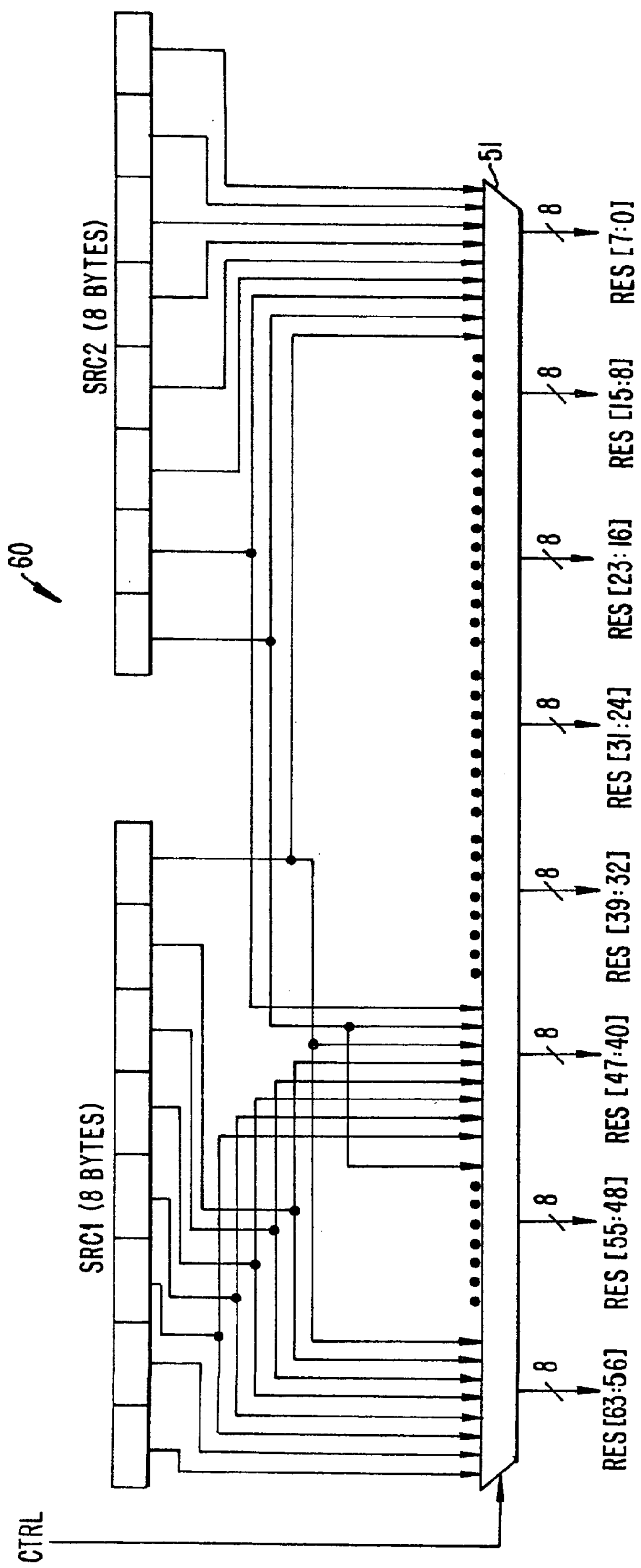

Referring now to FIGS. 7*a*–7*c*, the graphics data alignment instructions, and the relevant portions of one embodiment of the graphics data alignment circuit are illustrated. As shown in FIG. 7*a*, there are two graphics data address calculation instructions 98*a*–98*b*, and one graphics data alignment instruction 100 for calculating addresses of misaligned graphics data, and aligning misaligned graphics data.

The ALIGNADDR instruction 98*a* adds the content of the rs1 and rs2 registers, and stores the result, except that the least significant 3 bits are forced to zeroes, in the rd register. The least significant 3 bits of the result are stored in the alignaddr_offset field of GSR 50. The ALIGNADDRL instruction 98*b* is the same as the alignaddr instruction 98*a*, except that the twos complement of the least significant 3 bits of the result is stored in the alignaddr_offset field of GSR 50.

The FALIGNDATA instruction 100 concatenates two 64-bit floating point values in the rs1 and rs2 registers to form a 16-byte value. The floating point value in the rs1 register is used as the upper half of the concatenated value, whereas the floating point value in the rs2 register is used as the lower half of the concatenated value. Bytes in the concatenated value are numbered from the most significant byte to the least significant byte, with the most significant byte being byte 0. Eight bytes are extracted from the concatenated value, where the most significant byte of the extracted value is the byte whose number is specified by the alignaddr_offset field of GSR 50. The result is stored as a 64 bit floating point value in the rd register.

Thus, as illustrated in FIG. 7*b*, by using the ALIGNADDRESS {_LITTLE} instruction to generate and store the alignaddr_offset in the GSR 50 (step a), copying the two portions of a misaligned graphics data block 99*a*–99*b* from memory into the rs1 and rs2 registers, aligning and storing the aligned graphics data block into the rd register using the FALIGNDATA instruction, and then copying the aligned graphics data block 101 from the rd register into a new memory location, a misaligned graphics data block 99*a*–99*b* can be aligned in a quick and efficient manner.

As shown in FIG. 7*c*, in this embodiment, the graphics data alignment circuit 60 comprises a 64-bit multiplexer 51, coupled to each other and the floating point register file as shown. The multiplexer 51 aligns misaligned graphics data as described above. The same multiplexer, with different controls, can be used for the expand and merge operations.

Data Packing Instructions

Referring now to FIGS. 8*a*–8*g*, the graphics data packing instructions, and the relevant portions of the packing portion of the graphics data pack circuit 59 are illustrated. As illustrated in FIGS. 8*a*–8*d*, there are three graphics data packing instructions 106*a*–106*c*, for simultaneously packing four 16-bit graphics data into four 3-bit graphics data, two 32-bit graphics data into two 8-bit graphics data, and two 32-bit graphics data into two 16-bit graphics data.

The FPACK16 instruction 106*a* takes four 16-bit fixed values in the rs2 register, left shifts them in accordance to the scale_factor in GSR 50 (maintaining the clipping information), then extracts and clips 8-bit values starting at the corresponding immediate bits left of the implicit binary positions (between bit 7 and bit 6 of each 16-bit value). If the extracted value is negative (i.e., msb is set), zero is delivered as the clipped value. If the extracted value is greater than 255, 255 is delivered. Otherwise, the extracted value is the final result. The clipped values are correspondingly placed in the rd register.

The FPACK32 instruction 106*b* takes two 32-bit fixed values in the rs2 register, left shifts them in accordance to the scale_factor in GSR 50 (maintaining the clipping information), then extracts and clips 8-bit values starting at the immediate bits left of the implicit binary positions (i.e., between bit 23 and bit 22 of a 32-bit value). For each extracted value, clipping is performed in the same manner as described earlier. Additionally, the FPACK32 instruction 106*b* left shifts each 32-bit value in the rs1 register by 8 bits. Finally, the FPACK32 instruction 106*b* correspondingly merges the clipped values from the rs2 register with the shifted values from the rs2 register, with the clipped values occupying the least significant byte positions. The resulting values are correspondingly placed in the rd register.

The FPACKFIX instruction 106*a* takes two 32-bit fixed values in the rs2 register, left shifts each 32-bit value in accordance to the scale_factor in GSR 50 (maintaining the clipping information), then extracts and clips 16-bit values starting at the immediate bits left of the implicit binary positions (i.e., between bit 16 and bit 15 of a 32-bit value). If the extracted value is less than −32768, −32768 is delivered as the clipped value. If the extracted value is greater than 32767, 32767 is delivered. Otherwise, the extracted value is the final result. The clipped values are correspondingly placed in the rd register.

Figures 8A, 8B:
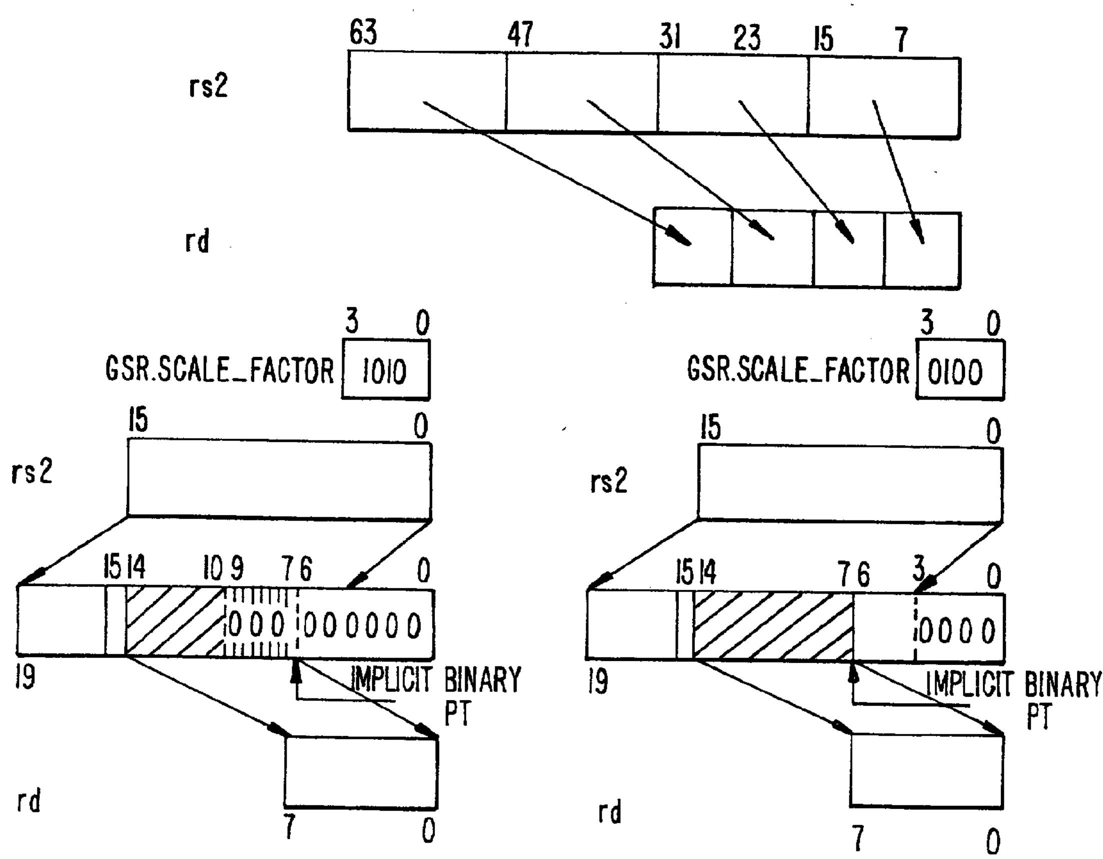
FIGS. 8*a*–8*g* illustrate the graphics data packing instructions and circuitry in further detail.
Figure 8C:
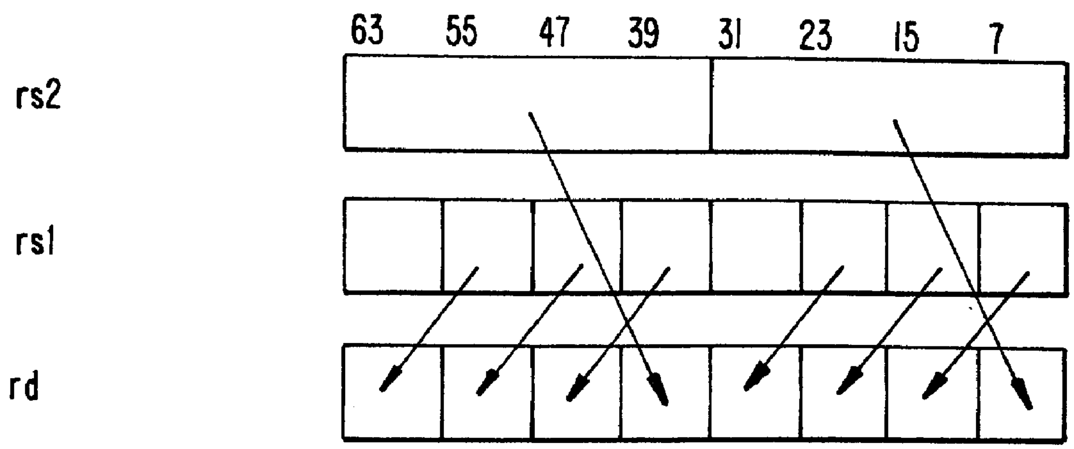
Figure 8C:
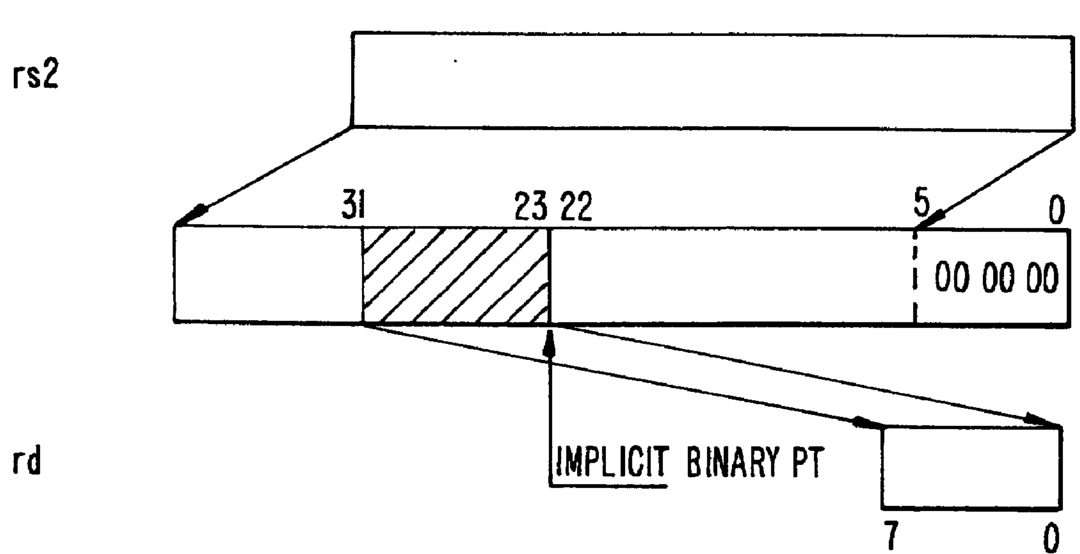
Figure 8D:
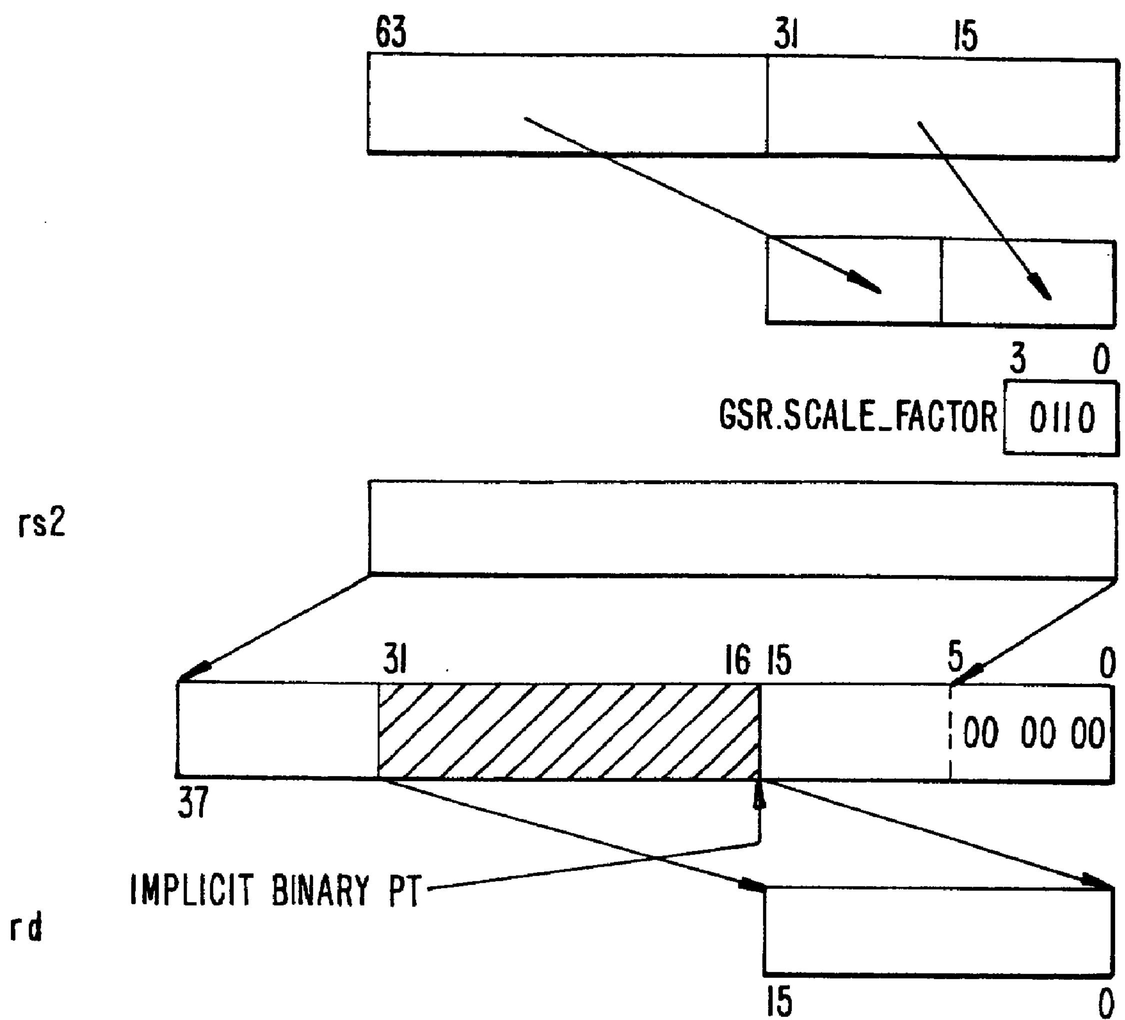
Figure 8E:
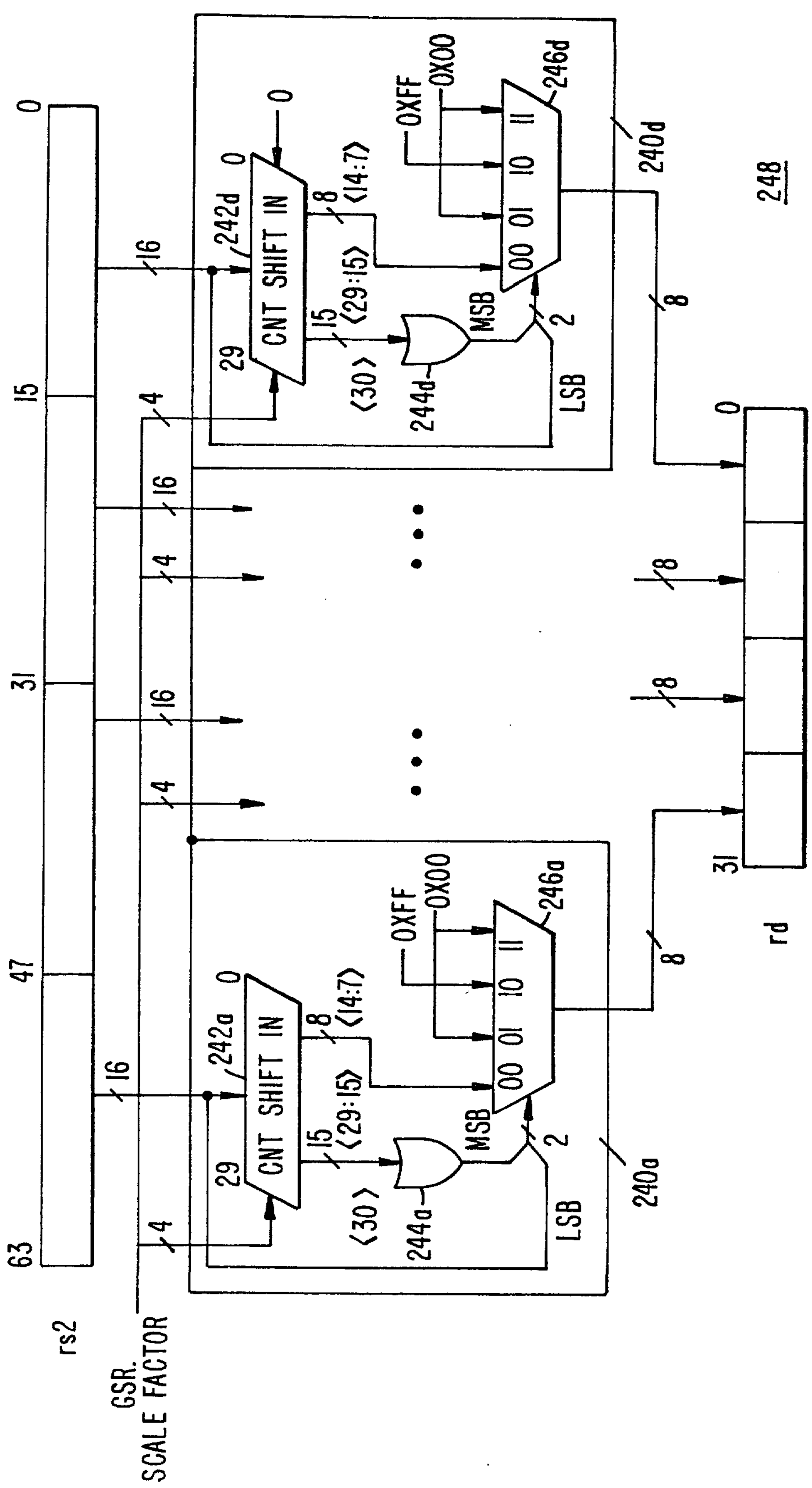
Figure 8F:
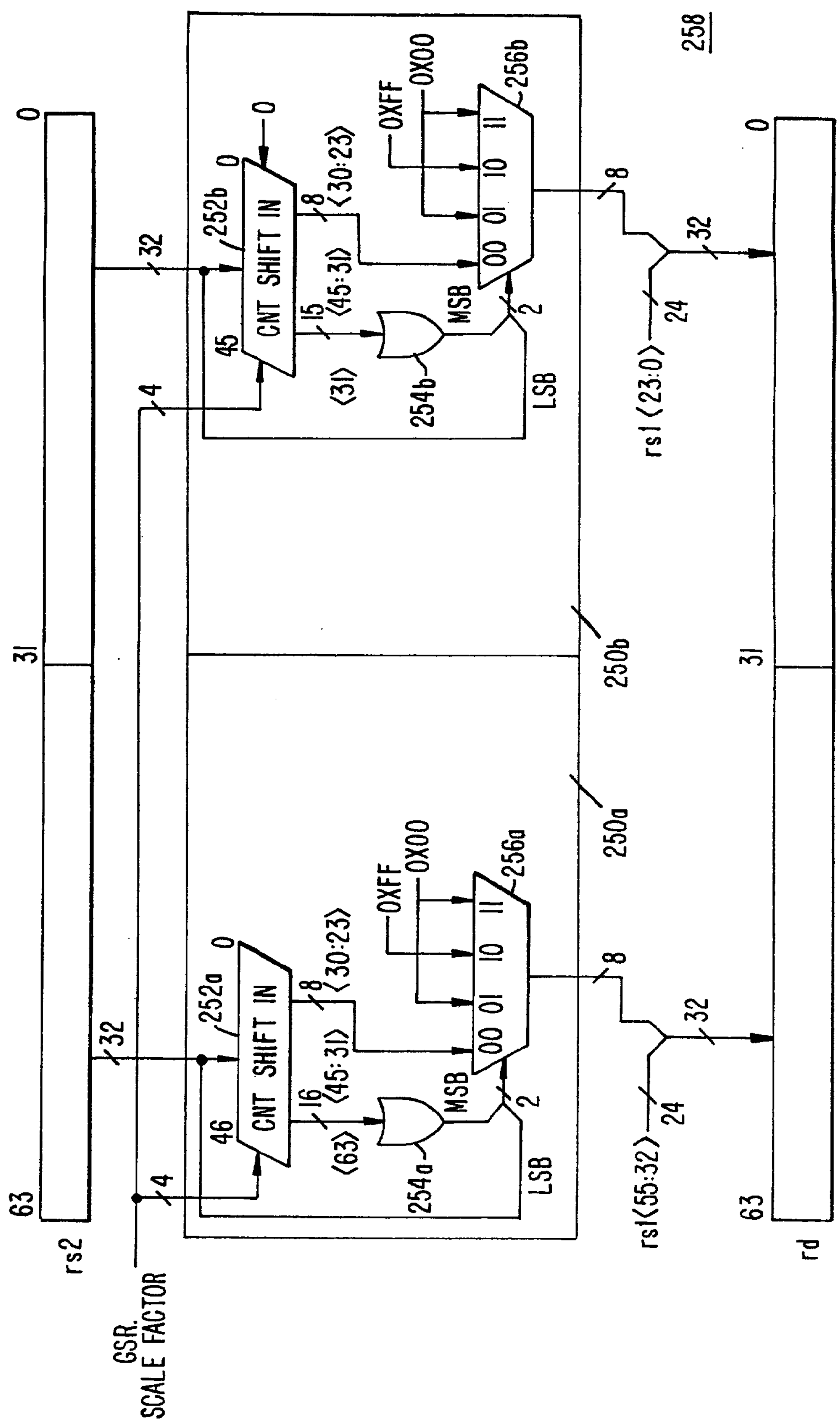
Figure 8G:
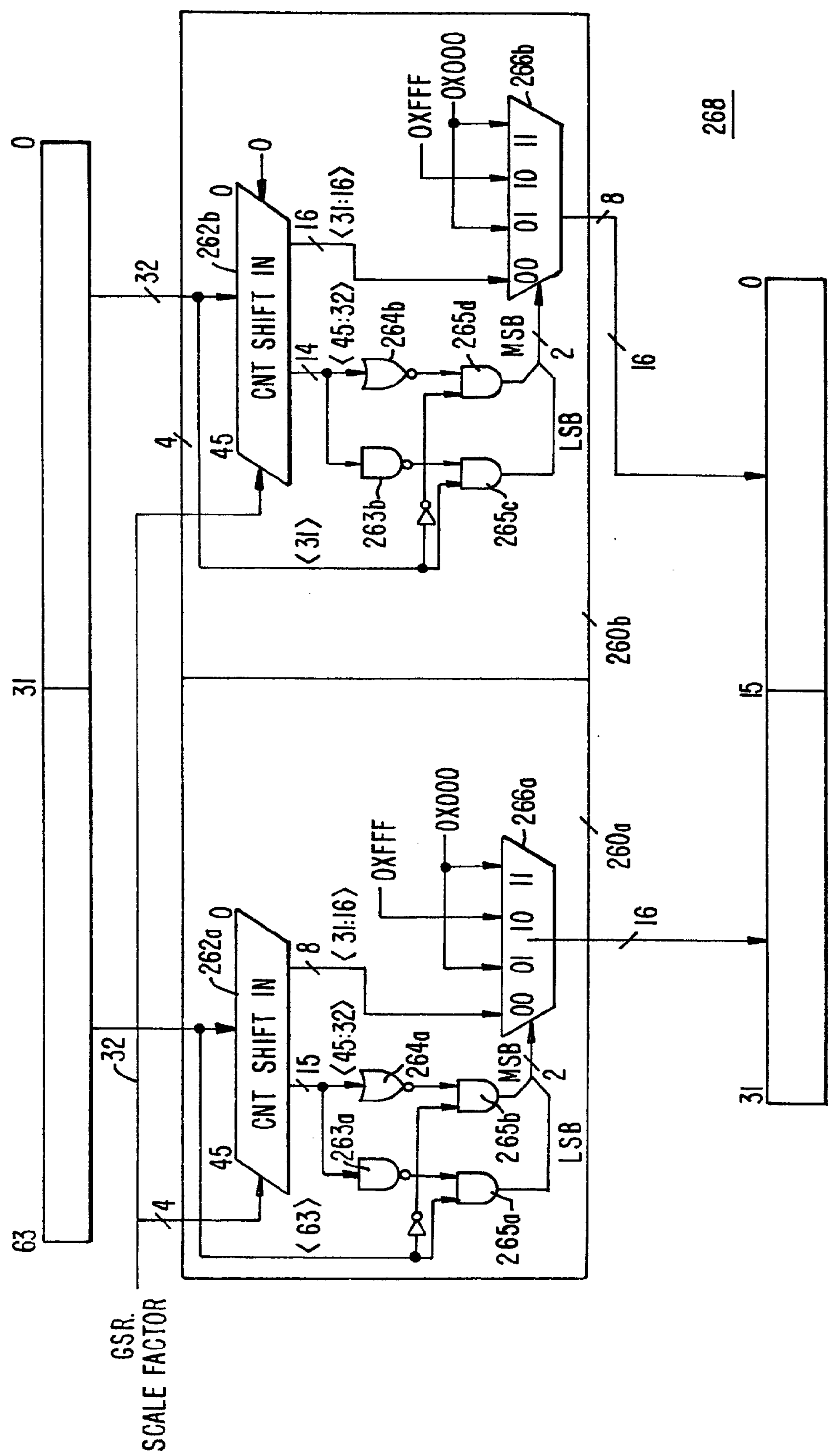

As illustrated in FIGS. 8*e*–8*g*, in this embodiment, the graphics data packing circuit 59 comprises circuitry 248, 258 and 268 for executing the FPACK16, FPACK32, and FPACKFIX instructions respectively. The same actual circuitry may be used, with different controls. Three different drawings are used for ease of understanding the logic.

The circuitry 248 for executing the FPACK16 instruction comprises four identical portions 240*a*–240*d*, one for each of the four corresponding 16-bit fixed values in the rs2 register. Each portion 240*a*, . . . or 240*d* comprises a shifter 242*a*, . . . or 242*d*, an OR gate 244*a*, . . . or 244*d*, and a multiplexer 246*a*, . . . or 246*d*, coupled to each other as shown. The shifter 242*a*, . . . or 242*d* shifts the corresponding 16-bit fixed value (excluding the sign bit) according to the scale factor stored in the GSR 50. The sign bit and the logical OR of bits [29:15] of each of the shift results are used to control the corresponding multiplexer 246*a*, . . . or 242*d*. Either bits [14:7] of the shift result, the value 0×FF or the value 0×00 are output.

The circuitry 258 for executing the FPACK32 instruction comprises two identical portions 250*a*–250*b*, one for each of the two corresponding 32-bit fixed values in the rs2 register. Each portion 250*a* or 250*b* also comprises a shifter 252*a* or 252*d*, an OR gate 254*a* or 254*b*, and a multiplexer 256*a* or 256*b*, coupled to each other as shown. The shifter 252*a* or 252*d* shifts the corresponding 32-bit fixed value (excluding the sign bit) according to the scale factor stored in the GSR 50. The sign bit and the logical OR of bits [45:31] of each of the shift results are used to control the corresponding multiplexer 256*a* or 256*b*. Either bits [30:23] of the shift result, the value 0×FF or the value 0×00 are output. The output is further combined with either bits [55:32] or bits [23:0] of the rs1 register.

The circuitry 268 for executing the FPACKFIX instruction also comprises two identical portions 260*a*–260*b*, one for each of the two corresponding 32-bit fixed values in the rs2 register. Each portion 260*a* or 260*b* also comprises a shifter 262*a* or 262*d*, a NAND gate 263*a* or 263*b*, a NOR gate 264*a* or 264*b*, two AND gates 265*a*–265*b* or 265*c*–265*d*, and a multiplexer 266*a* or 266*b*, coupled to each other as shown. The shifter 262*a* or 262*d* shifts the corresponding 32-bit fixed value (excluding the sign bit) according to the scale factor stored in the GSR 50. The logical AND of the sign bit and the logical NAND of bits [45:32] of each of the shift results, and the logical AND of the inverted sign bit and the logical NOR of bits [45:32] of each of the shift results, are used to control the corresponding multiplexer 266*a* or 266*b*. Either bits [31:16] of the shift result, the value 0×EFFF or the value 0×8000 are output.

Pixel Distance Instruction

Figure 9B:
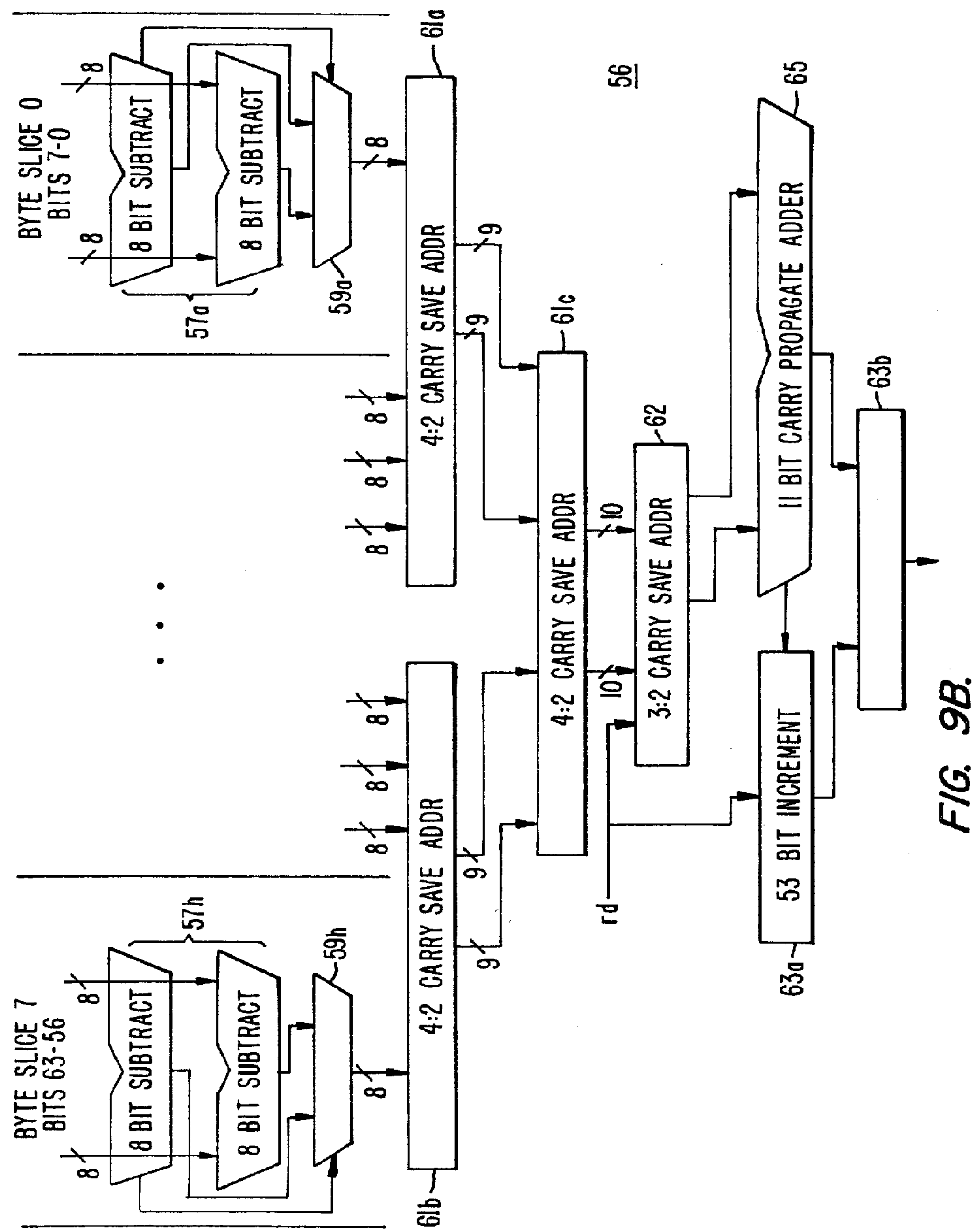

Referring now to FIGS. 9*a*–9*b*, the pixel distance computation instructions, and the pixel distance computation circuit are illustrated. As shown in FIG. 9*a*, there is one graphics data distance computation instruction 138 for simultaneously accumulating the absolute differences between graphics data, eight pairs at a time. The PDIST instruction 138 subtracts eight 8-bit graphics data in the rs1 register from eight corresponding 8-bit graphics data in the rs2 register. The sum of the absolute values of the differences is added to the content of the rd register. The PDIST instruction is typically used for motion estimation in video compression algorithms.

As shown in FIG. 9*b*, in this embodiment, the pixel distance computation circuit 56 comprises eight pairs of 8 bit subtractors 57*a*–57*b*. Additionally, the pixel distance computation circuit 56 further comprises three 4:2 carry save adders 61*a*–61*c*, a 3:2 carry save adder 62, two registers 63*a*–63*b*, and a 11-bit carry propagate adder 65, coupled to each other as shown. The eight pairs of 8 bit subtractors 57*a*–57*h*, the three 4:2 carry save adders 61*a*–61*c*, the 3:2 carry save adder 62, the two registers 63*a*–63*b*, and the 11-bit carry propagate adder 65, cooperate to compute the absolute differences between eight pairs of 8-bit values, and aggregate the absolute differences into a 64-bit sum.

The pair of 8-bit subtractors 57 generate the absolute value of the difference by first subtracting a first pixel from a second pixel, and then subtracting the second pixel from the first pixel. The value which is positive is chosen by multiplexer 59. Four pixel values are combined in adder 61*b*, and another four in adder 61*a*. The results are then combined in another carry/save adder 61*c* to give the final two result values to adder 62, which then combines them with the previous accumulated sum from the rd register.

The final result is stored in register 63*b* in the floating point register file. This register is a 64-bit register, and the results can eventually accumulate to use up a large number of bits. The upper 53-bit portions are provided back to the input through register 63$a$, with the lower bits being combined in carry save adder 62 into an 11-bit carry propagate adder 65. Thus, the data paths are minimized through the carry save adders to be 8 bits initially into carry save adder 61$a$ and 61$b$, then 9 bits to adder 61$c$, 10 bits to adder 62 and eventually 11 bits for adder 65. The use of separate register 63$a$ allows the upper order bits in the accumulated results to be separately combined with any carry from the adder 65.

Data Edge Handling Instructions

Referring now to FIGS. 10$a$–10$b$, the graphics data edge handling instructions are illustrated. The edge handling instructions are used to create a mask used to identify a start or stop address for an image, such as where an image is being written to a window on a display, and the edges of the window need to be identified. As illustrated, there are six graphics edge handling instructions 140$a$–140$f$, for simultaneously generating eight 8-bit edge masks, four 16-bit edge masks, and two 32-bit edge masks in big or little endian format.

The masks are generated in accordance to the graphics data addresses in the rs1 and rs2 registers, where the addresses of the next series of pixels to render and the addresses of the last pixels of the scan line are stored respectively. The generated masks are stored in the least significant bits of the rd register.

Each mask is computed from the left and right edge masks as follows:

a) The left edge mask is computed from the 3 least significant bits (LSBs) of the rs1 register, and the right edge mask is computed from the 3 (LSBS) of the rs2 register in accordance to FIG. 10$b$.

b) If 32-bit address masking is disabled, i.e., 64-bit addressing, and the upper 61 bits of the rs1 register are equal to the corresponding bits of the rs2 register, then rd is set equal to the right edge mask ANDed with the left edge mask.

d) Otherwise, rd is set to the left edge mask.

Additionally, a number of conditions codes are modified as follows:

a) a 32-bit overflow condition code is set if bit 31 (the sign) of rs1 and rs2 registers differ and bit 31 (the sign) of the difference differs from bit 31 (the sign) of rs1; a 64-bit overflow condition code is set if bit 63 (the sign) of rs1 and rs2 registers differ and bit 63 (the sign) of the difference differs from bit 63 (the sign) of rs1.

b) a 32-bit negative condition code is set if bit 31 (the sign) of the difference is set; a 64-bit negative condition code is set if bit 63 (the sign) of the difference is set.

c) a 32-bit zero condition code is set if the 32-bit difference is zero; a 64-bit zero condition code is set if the 64-bit difference is zero.

As described earlier, the graphics edge handling instructions 140$a$–140$f$ are executed by the IEU 30. No additional hardware is required by IEU 30.

Memory Bandwidth Optimization Techniques

The present invention provides a number of instructions and corresponding logic for limiting the number of memory accesses required in a CPU superscalar environment including a cache memory.

The graphics data memory reference instructions 222 include a partial (conditional) store, a short load, a short store, a block load and a block store instruction. The graphics data load and store instructions are qualified by the imm_asi and asi values to determine whether the graphics data load and store instructions 144 and 146 are to be performed simultaneously on 8-bit graphics data, 16-bit graphics data, and whether the operations are directed towards the primary or secondary address spaces in big or little endian format. For the store operations, the imm_asi and asi values further serve to determine whether the graphics data store operations are conditional. These graphics data memory reference instructions 222 are executed by the LSU 48 of the CPU 10, and access the floating point register file.

Partial Store Instruction

A partial (conditional) store operation allows only certain pixel values within a 64-bit group to be stored in a register or to memory. This instruction may be used, for instance, when writing to the frame buffer for displaying on a display. A mask is previously generated with a compare operation to determine which pixels are in front in the Z plane. Only the pixels which are in front (visible) are written, with the mask blocking out the rest. Thus, rather than the need to compare and write on a pixel-by-pixel basis, an entire 64-bit block of pixels can be written at one time, greatly reducing the number of memory accesses required.

The partial store is a read-modify-write operation for use with cached memory, not main memory. A partial (conditional) store operation stores the appropriate number of values from the rd register to the addresses specified by the rs1 register using the mask specified (in the rs2 bit location). The mask has the same format as the results generated by the pixel compare instructions. The most significant bit of the mask corresponds to the most significant part of the rs1 register.

Short Load/Store Instructions

Load and store operations are typically performed for the integer unit, and stored in the integer register file. Accordingly, circuitry is added to the load/store unit to modify the control of the same logic so that a floating point load is treated like an integer load, except that the destination is the floating point register file. The store operation is the reverse of the load, with the control logic in the load/store unit being modified in the same manner.

A short 8-bit load operation may be performed against arbitrary byte addresses. For a short 16-bit load operation, the least significant bit of the address must be zero. Short loads are zero extended to fill the entire floating point destination register. Short loads are zero extended to fill the entire floating point destination register. Short stores access either the low order 8 or 16 bits of the floating point source register. A block load/store operation transfers data between 8 contiguous 64-bit floating point registers and an aligned 64-byte block in memory.

3-D Array Addressing Instructions

Figure 11A:
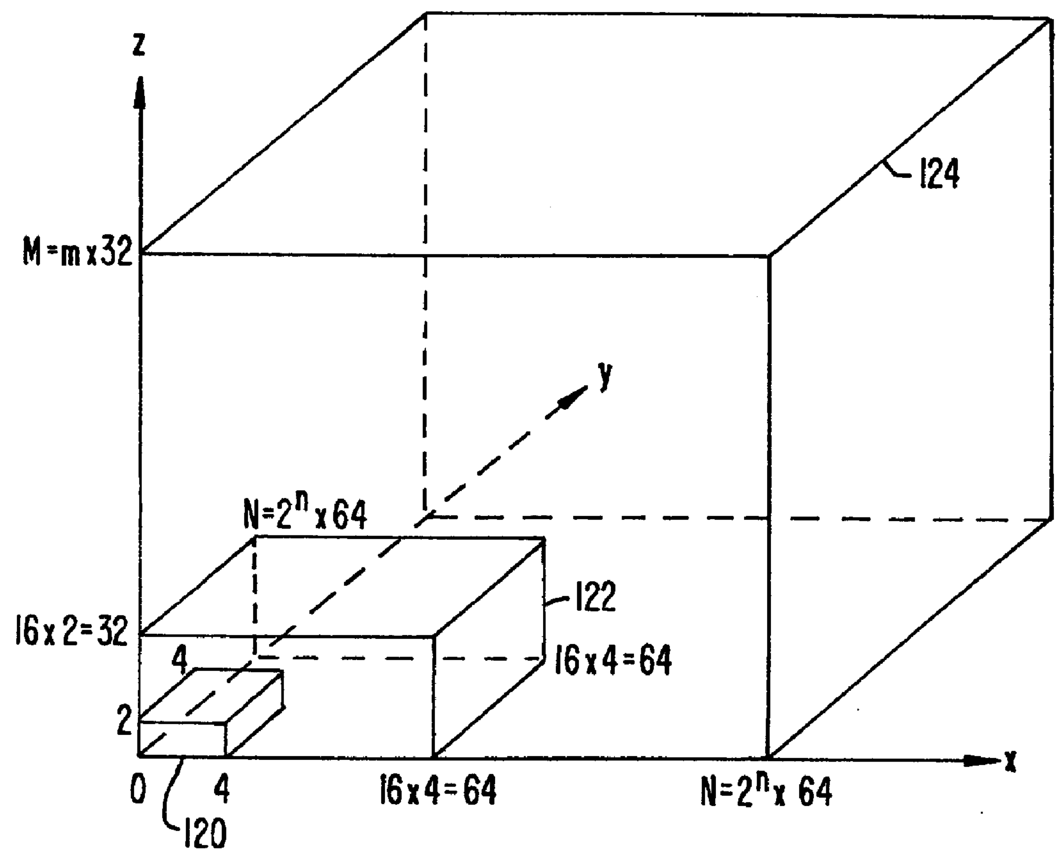
Figure 11I:
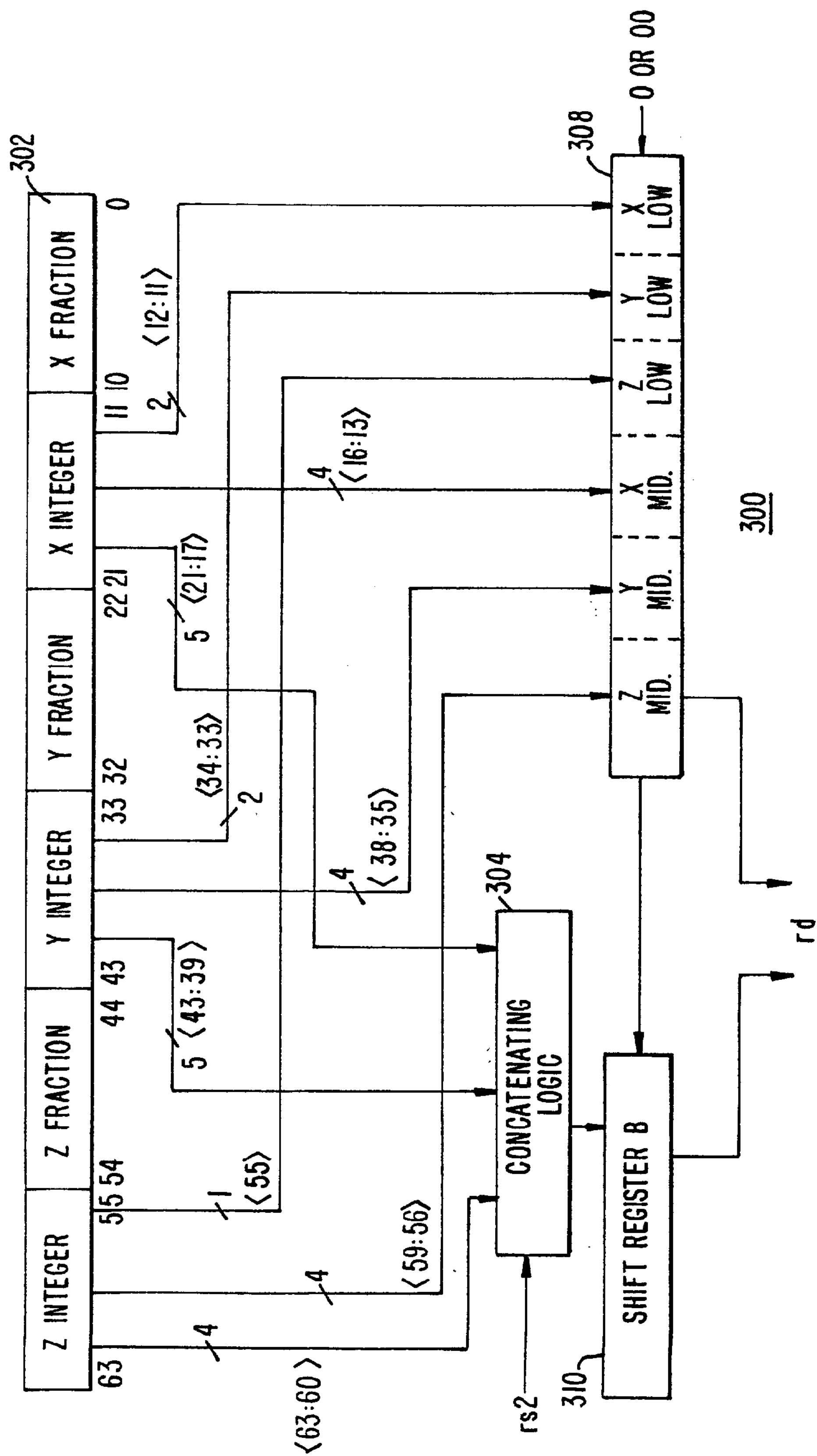

Referring now to FIGS. 11$a$–11$b$, the 3-D array addressing instructions and circuitry are illustrated.

FIG. 11$a$ illustrates a 3-D address space as a cube. In a typical addressing scheme for a frame buffer, the pixels are specified starting with the first row in the Y direction, with the position in the row in the X direction being indicated by increasing addresses. When the end of the row is reached, the next row in the Y direction is started, and the X positions are stepped through again. When an entire XY plane has been addressed, the next XY plane in the Z direction is then addressed. Such an addressing scheme is problematic for a CPU using a cache and a TLB, since references to separate Z planes will result in cache or TLB misses. Accordingly, the array instructions of the present invention remap the pixels into a format which provides a greater likelihood of cache and TLB hits for certain applications, such as medical imaging. Using the array instructions, the pixels in the memory space are mapped into a new memory space using the revised addressing scheme. The addressing scheme breaks up the memory space into a number of blocks, with a smaller block 120 in FIG. 11*a* being indicated as the "lower" portion of an address. The middle-size block 122 is made up of a series of lower blocks 120. Finally, the upper block 124 is made up of a number of middle blocks 122.

Because the total image volume may vary, the size of the upper block can vary as well. As illustrated in FIG. 11*c*, six different values of rs2 can specify the number of elements (upper blocks) included within the address space. The particular value will vary the split between the XY and Z coordinates for the upper block as indicated in FIGS. 11*e*–11*g*. FIGS. 11*e*–11*g* also indicate the different pixel formats of 8, 16 and 32 bits, with the larger formats including a single zero or double zero being shifted in the least significant bits as illustrated.

For example, using the format of FIG. 11*e*, if the rs2 value is zero, the upper block has one bit for the X position, and no bits for the Y or Z position. If the rs2 value is 1, there is one bit for X, 17, one bit for Y, 18 (17 plus rs2=18) and 3 bits for Z, extending from bit 19 (17 plus 2 rs2) to 22 (20 plus 2rs2). Once the pixels have been converted into a new address space, that new address space can be used for the other operations for rendering or otherwise manipulating an image.

As illustrated in FIG. 11*a*, there are three 3-D array addressing instructions 142*a*–142*c* for converting 8-bit, 16-bit, and 32-bit 3-D addresses to blocked byte addresses. Each of these instructions 142*a*–142*c* converts 3-D fixed point addresses in the rs1 register to a blocked byte address, and store the resulting blocked byte address in the rd register. These registers are in the integer register file. These instructions 142*a*–142*c* are typically used for address interpolation for planar reformatting operations. Blocking is performed at the 64-byte level to maximize external cache block reuse, and at the 64k-byte level to maximize external cache block reuse, and at the 64k-byte level to maximize the data cache's translation lookaside buffer (TLB) entry reuse, regardless of the orientation of the address interpolation. The element size, i.e., 8-bits, 16-bits, or 32-bit, is implied by the instruction. The value of the rs2 register specifies the power of two sizes of the X and Y dimension of a 3d image array. In the embodiment illustrated, the legal values are from zero to five. A value of zero specifies 64 elements, a value of one specifies 128 elements, and so on up to 2048 elements for the external cache block size specified through the value of five. The integer parts of X, Y, and Z (rs1) are converted to either the 8-bit, the 16-bit, or the 32-bit format. The bits above Z upper are set to zero. The number of zeros in the least significant bits is determined by the element size. An element size of eight bits has no zero, an element size of 16-bits has one zero, and an element size of 32-bits has two zeros. Bits in X and Y above the size specified by the rs2 register are ignored.

As described earlier, the 3-D array addressing instructions 142*a*–140*a* are also executed by the IEU 30. FIG. 11*b* illustrates one embodiment of the additional circuitry provided to the IEU 30. The additional circuitry 300 comprises two shift registers 308 and 310, and concatenation logic 304, coupled to each other as shown. The appropriate bits from the lower and middle integer portions of X, Y, and Z (i.e., bits <12:11>, <34:33>, <55>, <16:13>, <38:35>, and <59:56>) are first stored into shift register A 308. Similarly, the appropriate bits of the upper integer portion of Z (i.e., <63:60>) and the upper integer portions of Y and X are loaded into shift register B 310 from concatenation logic 304, depending on the value of rs2. Finally, zero, one, or two zero bits are shifted into shift register A 308, with the shift out bits shifted into shift register B 310, depending on the array element size (i.e., 8, 16, or 32 bits).

While the present invention has been described in terms of presently preferred and alternate embodiments, those skilled in the art will recognize the invention is not limited to the embodiments described. The method and apparatus of the present invention can be practiced with modification and alteration within the spirit and scope of the appended claims. The description is thus to be regarded as illustrative of, and not limiting the scope of the present invention.

What is claimed is:

1. A microprocessor comprising:

an instruction fetch and dispatch unit;

a plurality of execution units, including an integer execution unit, a floating-point execution unit, wherein said floating point execution unit comprises first and second floating point execution units, each separately coupled to said instruction fetch and dispatch unit, and each containing at least one specialized graphics execution circuit, and a plurality of graphics execution circuits added to said floating-point execution unit;

a first register file coupled to said integer unit; and a second register file coupled to said floating-point execution unit;

wherein said first floating-point execution unit includes an ALU, and said second floating-point execution unit includes a multiplier; and wherein said specialized graphics circuit in said second floating-point execution unit further comprises a pixel distance computation circuit configured to calculate and accumulate the difference between multiple pairs of pixels, said pixel distance computation circuit and said multiplier being configured in parallel such that only one can receive a decoded instruction from said fetch and dispatch unit in a given clock cycle.

2. The microprocessor of claim 1 wherein said pixel distance computation circuit comprises:

a subtractor configured to subtract multiple pixel values in parallel; and a plurality of adders for providing a total absolute value sum of the subtraction operations on said multiple pixels.

3. A microprocessor comprising:

an instruction fetch and dispatch unit;

a plurality of execution units, including an integer execution unit, a floating-point execution unit, and a plurality of graphics execution circuits added to said floating-point execution unit;

a first register file coupled to said integer unit; and a second register file coupled to said floating-point execution unit;

wherein said floating-point execution unit comprises first and second floating-point execution units, each separately coupled to said instruction fetch and dispatch unit, and each containing at least one specialized graphics execution circuit; wherein said first floating point execution unit includes an ALU, and said second floating point execution unit includes a multiplier; and wherein said specialized graphics circuit in said second floating-point execution unit further comprises a pixel packing circuit configured to pack N-bit pixels into an M-bit format, where M is less than N, said pixel packing circuit being in parallel with said multiplier.

4. A microprocessor comprising:

an instruction fetch and dispatch unit;

a plurality of execution units, including an integer execution unit, a floating-point execution unit, and a plurality of graphics execution circuits added to said floating-point execution unit;

a first register file coupled to said integer unit; and a second register file coupled to said floating-point execution unit;

wherein said floating-point execution unit comprises first and second floating-point execution units, each separately coupled to said instruction fetch and dispatch unit, and each containing at least one specialized graphics execution circuit, wherein said first floating point execution unit includes an ALU, and said second floating point execution unit includes a multiplier; and wherein said specialized graphics circuit in said first floating-point execution unit further comprises a graphics alignment circuit in parallel with said ALU.

5. The microprocessor of claim 4 further comprising a graphics status register accessible by said first and second graphics execution units, and wherein said graphics alignment circuit comprises a multiplexer having inputs coupled to first and second registers in said floating point register file, and a control selection input circuit coupled to said graphics status register.

6. A microprocessor comprising:

an instruction fetch and dispatch unit;

a plurality of execution units, including an integer execution unit, and a plurality of graphics execution circuits added to said floating-point execution unit;

a first register file coupled to said integer unit; and a second register file coupled to said floating-point execution unit; and wherein said microprocessor includes a cache memory, and said integer execution unit further comprises a dedicated block address conversion circuit, distinct from other integer operation circuitry, for converting pixel addresses from a 3D format having X, Y, and Z coordinates linearly set forth in an address to a blocked byte format having addresses with a less significant portion of said X, Y and Z coordinates followed by a more significant portion of said X, Y and Z coordinates.

7. The microprocessor of claim 6 wherein said blocked byte format further comprises a most significant portion of said X, Y and Z coordinates following said more significant portions, such that said blocked byte address consists of a low, middle and high portion of the X, Y and Z coordinates.

8. The microprocessor of claim 7 wherein said low portion corresponds to a cache line.

9. The microprocessor of claim 7 wherein all addresses specified by said middle portion correspond to a single page of a virtual address for said microprocessor.

* * * * *